United States Patent
Lindy

(10) Patent No.: US 11,200,629 B2
(45) Date of Patent: Dec. 14, 2021

(54) PROPERTY MANAGEMENT SYSTEM AND RELATED METHODS

(71) Applicant: LINDY PROPERTY MANAGEMENT COMPANY, Jenkintown, PA (US)

(72) Inventor: Frank Lindy, Jenkintown, PA (US)

(73) Assignee: LINDY PROPERTY MANAGEMENT COMPANY, Jenkintown, PA (US)

(*) Notice: Subject to any disclaimer, the term of this patent is extended or adjusted under 35 U.S.C. 154(b) by 276 days.

(21) Appl. No.: 16/453,542

(22) Filed: Jun. 26, 2019

(65) Prior Publication Data

US 2020/0020056 A1    Jan. 16, 2020

Related U.S. Application Data

(63) Continuation-in-part of application No. 16/034,095, filed on Jul. 12, 2018, now abandoned.

(51) Int. Cl.
    *G06Q 50/16*      (2012.01)
    *G06F 9/451*      (2018.01)
    *G06F 3/0482*     (2013.01)
    *G06F 3/0484*     (2013.01)
    *G06T 11/60*      (2006.01)
    *G06F 40/186*     (2020.01)

(52) U.S. Cl.
    CPC ......... *G06Q 50/163* (2013.01); *G06F 3/0482* (2013.01); *G06F 3/04847* (2013.01); *G06F 9/451* (2018.02); *G06F 40/186* (2020.01); *G06T 11/60* (2013.01); *G06T 2200/24* (2013.01)

(58) Field of Classification Search
    CPC .. G06Q 50/16; G06Q 50/163; G06Q 30/0645; G06F 16/283
    USPC .................................................. 705/313, 307
    See application file for complete search history.

(56) References Cited

U.S. PATENT DOCUMENTS

| | | | |
|---|---|---|---|
| 2005/0154657 A1* | 7/2005 | Kim ..................... | G06Q 20/207 705/30 |
| 2006/0129482 A1* | 6/2006 | Etzkorn ................. | G06Q 20/10 705/39 |
| 2006/0190279 A1* | 8/2006 | Heflin .................... | G06Q 30/00 705/307 |
| 2012/0259876 A1 | 10/2012 | Mathai | |

(Continued)

OTHER PUBLICATIONS

Tenantcloud Rental Accounting and Management, [online], archived on Nov. 5, 2017, available at: < https://web.archive.org/web/20171105012726/https://www.tenantcloud.com/landlord > (Year: 2017).*

*Primary Examiner* — Richard W. Crandall
(74) *Attorney, Agent, or Firm* — Archer & Greiner, P.C.; Richard P. Gilly, Esquire

(57) ABSTRACT

An improved computerized system and method for management of leased real property, including amenities inspection features for dwelling units in multi-unit dwellings. The amenities inspection features allow for input of additional amenities on a per-dwelling unit basis, as well as input of related photos of such amenities; editing of existing amenities to add or delete amenities; and upstream or back-end processing of inputted amenities data to analyze costs, availability, and otherwise assist in property rentals and management.

20 Claims, 13 Drawing Sheets

(56) References Cited

U.S. PATENT DOCUMENTS

| | | | |
|---|---|---|---|
| 2013/0332877 A1* | 12/2013 | Florance | G06Q 50/16 715/781 |
| 2014/0222697 A1* | 8/2014 | Maiani | G06Q 50/16 705/313 |
| 2014/0289136 A1* | 9/2014 | Godbee | G06Q 50/16 705/306 |
| 2015/0235333 A1 | 8/2015 | Bangerter | |
| 2015/0310523 A1* | 10/2015 | Silvernail | G06Q 30/0623 705/313 |
| 2016/0265949 A1 | 9/2016 | Rotondo | |
| 2016/0294572 A1 | 10/2016 | Shadid | |
| 2017/0186299 A1 | 6/2017 | Lection | |

* cited by examiner

FIG. 5

Click INSERT first to edit text in the notice. 157

No further warnings/will be given. Unless we hear from you within [number of days] with satisfactory results, we will commence legal action including the termination/non-renewal of your lease. 155

INSERT

Click INSERT first to edit text in the notice.

This letter serves as notice that should we receive any further complaints, we will be forced to take further action up to and including possible termination and/or non-renewal of your lease. We may also commence legal action in accordance with the violation. 155

INSERT

Click INSERT first to edit text in the notice.

The breakdown of these charges is as follows: 155 157

INSERT

Yours,

UPLOAD IMAGE     DELIVERY OPTIONS

FIG. 6

Ms. Smith
Unit 301
ABC Apts.

FROM: Jane Doe, Property Manager

RE: Invoice for Damage to Apartment Interior —161

159

Enclosed is an invoice for the Replacement of the broken window that was damaged in your apartment. Your responsibility to cover the cost of the damage incurred is set forth in "What Resident Agrees to - Repairs." It is important that you realize you are responsible for the action of. Per your Lease Contract, the amount of the invoice will be charged to your rental account. The charge totals $100 and must be paid within 30 days. The breakdown of these charges is as follows: This letter serves as notice that should we receive any further complaints, we will be forced to take further action up to and including possible termination and/or non-renewal of your lease. We may also commence legal action in accordance with the violation.+

161   161   163   161

If you have any questions please feel free to contact the Management Office at 555-555-5555. Thank you for your cooperation.

[SEE ATTACHED IMAGES]   [EDIT DELIVERY OPTION]   [EDIT TEXT]   [PRINT]

FIG. 7

| TURNOVER | RENOVATED UNITS | RENT READY UNITS | RENT READY UPGRADES | RENT ADJUSTMENTS/MISSING AMENITIES | VARIANCE REPORTING | MOVE OUT NOTICES |

-All Units- ▼   [ Download Excel ] [ View All Units ] [ View Amenities Count ]

Total Adjustments: -17,812.12   [ 001 | 002 | 003 | 004 | 005 | 006 | 007 | 008 | 009 | 010 ] - 335 | »

| | DATE INSPECTED | UNIT INFO | EXISTING AMENITY● | PRICE EXISTING AMENITY | MISSING AMENITY● | PRICE MISSING AMENITY | REMOVED AMENITY● | PRICE REMOVED AMENITY | ADJUSTMENT | TOTAL AMENITY | TECHNICIAN | VIEW DETAILS | DELETE |
|---|---|---|---|---|---|---|---|---|---|---|---|---|---|
| 1 | 06/07/2019 | 906-2 | Balcony 1 | $5.00 | | | | | | | | View Details | Delete |
| 2 | 06/07/2019 | 906-2 | Floor Adjustment-9 | $25.00 | | | | | | | | View Details | Delete |
| 3 | 06/07/2019 | 906-2 | | | Updated Tub2 | $15.00 | | | | | | View Details | Delete |
| 4 | 06/07/2019 | 906-2 | | | Plank Floor1 | $50.00 | | | | | | View Details | Delete |
| 5 | 06/07/2019 | 906-2 | | | RedevB | $225.00 | | | | | | View Details | Delete |
| 6 | 06/07/2019 | 906-2 | | | Den | $100.00 | | | | | | View Details | Delete |
| 7 | 06/07/2019 | 906-2 | | | Updated Tub | $25.00 | | | | | | View Details | Delete |
| 8 | 06/07/2019 | 906-2 | | | Countertop | $35.00 | | | | | | View Details | Delete |
| 9 | 06/07/2019 | 906-2 | | | | | PBAM040 | -$40.00 | | | | View Details | Delete |
| 10 | 06/07/2019 | 906-2 | | | | | Rehab-3 | -$225.00 | $185.00 View | $215.00 View | | View Details | Delete |
| 11 | 06/04/2019 | 906-2 | Balcony 8 | $5.00 | | | | | | | | View Details | Delete |
| 12 | 06/04/2019 | 906-2 | Floor Adjustment-9 | $25.00 | | | | | | | | View Details | Delete |
| 13 | 06/04/2019 | 906-2 | | | RedevB | $225.00 | | | | | | View Details | Delete |
| 14 | 06/04/2019 | 906-2 | | | Den | $100.00 | | | | | | View Details | Delete |
| 15 | 06/04/2019 | 906-2 | | | Updated Tub | $25.00 | | | | | | View Details | Delete |
| 16 | 06/04/2019 | 906-2 | | | Countertop | $35.00 | | | | | | View Details | Delete |
| 17 | 06/04/2019 | 906-2 | | | Updated Tub2 | $15.00 | | | | | | View Details | Delete |
| 18 | 06/04/2019 | 906-2 | | | Plank Floor1 | $50.00 | | | | | | View Details | Delete |
| 19 | 06/04/2019 | 906-2 | | | | | PBAM040 | -$40.00 | | | | View Details | Delete |
| 20 | 06/04/2019 | 906-2 | | | | | Rehab-3 | -$225.00 | $185.00 View | $215.00 View | | View Details | Delete |

FIG. 11

PROPERTY MANAGEMENT SYSTEM AND RELATED METHODS

FIELD

This disclosure relates generally to systems and methods for the management of real properties, especially for the management of multiple leased properties, both residential and commercial.

BACKGROUND

Property management systems of the prior art suffer from various drawbacks and disadvantages. For example, computer based systems may not include or may not sufficiently integrate all functions associated with management of one or a panoply of real properties, may not include analytics or statistics desirable to property owners and managers, or may not be flexible enough to accommodate the full range of management situations and associated workflows. As a result, property managers' performance of their duties using prior art systems may be suboptimal or otherwise unnecessarily time-consuming, and may likewise adversely affect the tenant experience at their rented unit, or efficient operations of the one or more properties under such prior art systems.

For example, it may be time consuming to customize warning notices to residents of apartment buildings. Each notice may require multiple customizations to fit the severity and timing and other circumstances. Because of the many customizations often necessary to complete a simple resident notice, it may be difficult for property management companies to maintain a consistent "voice" or tone in its resident notices.

Additionally, the notice may need to disclose the time or manner in which management learned of the violation and may need to reference a prior notice and the date of such notice. Another time consuming aspect of this task is that examples of standardized text may be scattered and the able manager needs to locate and keep them handy for reference. Finally, in an apartment community it is often desirable to have a steady "voice" in management's warning notices, regardless of which property manager may be issuing them. A further problem is that customized resident notices, when finished, may simply reside on the manager's computer and not be automatically saved to a central repository.

In addition to the need to generate notices to tenants efficiently and accurately, apartment house managers generally have numerous forms to send to tenants related to their maintenance and occupancy, a process which can be a logistical challenge.

Still further, issues may arise concerning the moving in of new tenants and the moving out of old tenants, such as keeping track of security deposits, making apartment repairs, and scheduling maintenance and other actions to allow rental to a new tenant after an old tenant has vacated the leased apartment or townhouse.

Another challenge to property management is having a complete and accurate picture of which of the various possible amenities are present or absent in which dwelling unit or multi-unit dwelling, so that rental prices of such units accurately reflect such amenities, or for other scheduling or management purposes.

In view of the foregoing, it would be advantageous to address these and other drawbacks and disadvantages of the prior art with an improved system and related methods for property management.

SUMMARY

The instant disclosure describes an improved property management system and method in which inter-related modules or subsystems (such terms used interchangeably herein) integrate a wide variety of property management functions and data, thereby improving computer system operation itself, as well as end-user operations. The subsystems are inter-related and inter-operable so as to provide flexibility to the user in performing property management functions, while at the same time standardizing such operations and making sure that all components of the property management operations have been accounted for or addressed, as detailed in this disclosure.

In one implementation, a computer-implemented system manages multiple, real properties comprising multi-unit dwellings or MUDs. (The term "multi-unit dwelling" or "MUD" shall include apartment buildings, houses, townhouse or townhome communities, and other multi-resident living communities under common management.) The system makes available through a user interface, such as a graphical user interface, multiple, respective, property management functions associated with electronic files and records of the units and tenants of the multiple buildings under management.

In one possible implementation, the system has been programmed so as to be capable of receiving user input to access or launch various property management subsystems, such as a residential notice subsystem, a certificates subsystem, a licenses subsystem, a contracts subsystem, a move-in/move-out subsystem, a statistics subsystem, and a resident assistance subsystem.

In certain possible operations, the disclosed system displays a series of screens corresponding to a selected property management function in a programmed order, in this way establishing a corresponding work flow for the user. For example, the system may display one screen of the series of screens and require user input therein, restricting display of a second or subsequent screens until after such input has been received.

In other variations, the system may comprise a residential notice subsystem which executes computer instructions to simplify and automate the generation of notices to residents of leased premises in the rental units. One possible operation of the residential notice subsystem involves retrieving, in response to user input, a template corresponding to one of the resident notices to be generated; displaying various notice components associated with the retrieved notice template; and during display of the retrieved notice template, displaying one or more user-selectable fields. The system may then display at least one user-selectable subfield after the user has selected the field. Multiple subfields may have different, respective text blocks associated with them. In this way, then, the user generates a residential notice by selecting fields and subfields by activating computer programming to insert the corresponding text block or blocks into the selected template. This both customizes the notice for certain aspects, but also standardizes many aspects of it so that it is consistent across multiple users for the circumstances.

The system programming associated with the resident notice subsystem may also include programming to display a warning-type menu, so that the resident notice to be generated includes text blocks or other indicia corresponding to a first notice, a second notice, a final notice, or a termination.

During the notice generation work flow, the system may be operated to generate resident notices by displaying notice components in the form of (1) standard text unalterable by the user; (2) populated text displayed in predetermined zones of a corresponding notice template; and (3) user-selectable fields of the template.

Another aspect of the property management system may include a move-in/move-out subsystem, which displays a move-in/move-out template after user-selection of a selected one of the units associated with a move-in or a move-out. In either case, a series of condition report fields are generated and displayed by this system as part of the move-in/move-out template, the condition report fields corresponding to amenities of the rental unit. The system is programmed to receive inputs by means of the condition report fields and is programmed to determine a value of an amenity score after receiving inputs into the condition report fields. Thereafter, the system compares the determined amenity score to a previously determined amenity score and, depending on meeting or exceeding threshold conditions, may positively or negatively adjust the unit rental price for the unit based on the change in the amenity score.

In one possible implementation, an amenities inspection engine may be part of the property management system. Though not required, such amenities inspection engine may be accessed during a move-out inspection, and thus be considered part of the move-in/move-out subsystem. The amenities inspection engine has front-end and back-end modules. The front-end module receives user data inputs related to amenities of one or more units associated with the one or more multi-unit dwellings associated with the property management system of this implementation. The back-end module processes the data inputs to accomplish various property management calculations, metrics, and related management functions.

The amenities inspection engine accesses an amenities database which, in turn, has a plurality of amenity identifiers and amenity values associated with such amenity identifiers. Thus, for example, amenity identifiers may be a label and corresponding field or other flag corresponding to a type of amenity found in one or more of the dwelling units, and the associated amenity values may be dollar values associated with such amenity and its corresponding amenity identifier.

In one possible implementation, the front-end module of the move-in/move-out subsystem includes programming capable of performing any of the following steps, in any suitable order, for a selected one of the units, such processing steps capable of being performed in response to suitable user input or other computer executed commands. Thus, for example, programming of the front-end module may be capable of performing the display of either existing amenities indicia or missing amenities indicia or both, such indicia corresponding to associated amenity identifiers and amenity values stored in the amenities database. The front-end may likewise, in response to user selection of a field for adding amenities, display a user-selectable list of amenities which are available to add to the property data record of the dwelling unit under consideration. Upon display of a user-selectable list of available amenities, the front-end may receive user input corresponding to one or more selections from such list. The one or more selections result in generating an added amenities listing, as a result of suitable programing of the front-end.

A user may access the front-end to associate digital images with the one or more selections comprising the added amenities listing. In one possible implementation, the front-end comprises a smart-phone app and the digital images are added by means of the camera associated with such smart-phone, and photos may be associated with the added amenities listing by virtue of a photo capture field.

In the disclosed implementation, the back-end module includes programming capable of performing various analytical or processing steps after receiving user input corresponding to the amenities at the front-end as described above. Thus, for example, the back-end may be suitably programmed to determine an additive amenity value corresponding to the added amenities listing generated by inputs at the front-end of the amenities inspection engine. In addition, the back-end module may likewise generate an adjusted unit rental price for the dwelling unit selected for inspection, such adjusted unit rental price being a function of added or deleted amenities and the associated amenity values. The back-end, upon receiving suitable inputs, either by upload or other data transfer, may in turn update the property data record to include the adjusted unit rental price determined from the added or deleted amenities.

The back-end module may likewise be programmed so as to be capable of sorting and displaying digital images associated with amenity identifiers, selected units, and selected multi-unit dwellings. Furthermore, user-selectable reports of amenities, including digital images, values, identifiers, or other suitable indicia associated with amenities, may be generated by suitable programming for any one of the multi-unit dwellings that comprise part of the property management system property data records.

The back-end may receive multiple amenity inspection records identifying a corresponding date, time, and inspector, such records associated with the updating of the property data record with added amenities or associated with the adjusted unit rental price. The user-selectable reports of amenities generated by the back-end may likewise tabulate in a spreadsheet or other suitable smartboard or dashboard a listing of amenities added or subtracted, and may likewise display reports showing adjusted unit rental price and associated amenities, including digital images thereof and associated amenity values.

Various tabulations and totals of amenity values and corresponding unit rental prices may be determined by suitable processing by the back-end and likewise the total number of amenity inspection records may be tabulated and sorted by multi-unit dwelling or other suitable metric so as to facilitate property management functions. For example, knowledge of how many units in a given multi-unit dwelling have a given amenity already existing, as opposed to needing such amenity to be installed, may be used for planning purposes in upgrading some or all of the units lacking such given amenity in the associated multi-unit dwelling. These and other budgeting, property upgrade management, repair, construction, and other renovations may be facilitated by suitable programming which sorts the amenity identifiers and associated values stored in property data records of the foregoing system. The foregoing features and functions of both the front-end and the back-end are facilitated by programming which displays output associated with the forms of any of the foregoing processing steps, such output, for example, being displayed on a user-viewable screen. The display may likewise be in the form of a spreadsheet with user-selectable fields or other user-selectable form.

The improved property management system of this disclosure may be operated in any number of ways and is thereby associated with various related methods. Other subsystems of the system may be operated to perform other property management functions. The system makes resident assistance available to tenants with medical conditions, disabilities or other special needs. Forms may be generated and sent electronically to residents for completion and return, including links as needed. Such a form builder subsystem may likewise monitor sending date of the form and track its return. The system may not only store the panoply of certificates, licenses, and contracts associated with property management, but enable tracking by expiration date, sorting and filtering, and communicate with inspection or other responsible personnel, using suitable database access and sorting programming or subroutines. Statistics may be generated by a corresponding subsystem, accessing property data stored in or accessible to the system, so as to monitor property management compliance, occupancy, pricing, and other parameters of interest to management.

BRIEF DESCRIPTION OF THE DRAWINGS

FIGS. 4-7 are displayed pages of a graphical user interface of the disclosed system associated with generating a resident notice;

FIG. 11 is another screenshot of the amenities inspection engine of FIG. 10;

DETAILED DESCRIPTION

Figure 1:
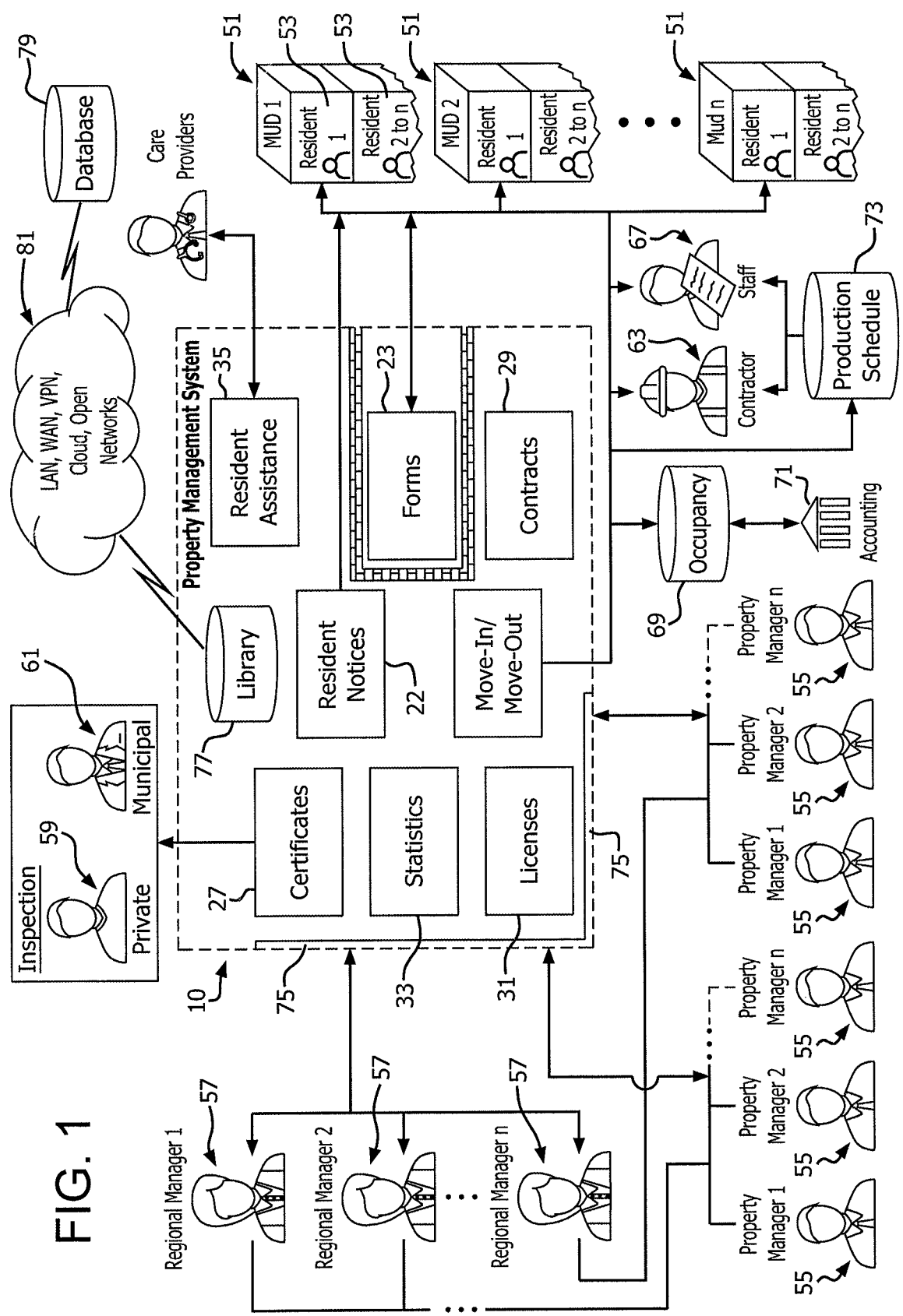
FIG. 1 is a schematic diagram of the system according to one possible implementation of the present disclosure.

FIG. 1 is a schematic diagram of one possible implementation of the improved system 10, showing subsystems 25 associated with property management functions, including a move-in/move-out module subsystem 21, a notice subsystem 22, a form builder subsystem 23, a certificates subsystem 27, a contracts subsystem 29, a licenses subsystem 31, a statistics subsystem 33, and a resident assistance subsystem 35.

FIG. 1 shows property management system 10 in relation to a variety of potential users of such systems and recipients of output from system 10, as well as the associated information, data or communication flows. In the illustrated implementation, system 10 is for managing multiple real properties comprising a plurality of multi-unit dwellings ("MUDs") 51 (whether apartment buildings, houses, townhomes, or other structures), each multi-unit dwelling having multiple residents or tenants 53 residing in rental units therein (whether apartments, floors, or homes).

The multi-unit dwellings 51 are generally managed by one or more corresponding property managers 55, who may report to regional managers 57, both of whom provide input to, and receive output from, property management system 10 in performing the various property management functions associated with subsystems 25. Additional users or personnel associated with property management system 10 may involve inspection personnel related to various certificates and other compliance aspects of MUDs 51, such as non-governmental inspectors 59 and municipal inspectors 61. Furthermore, in the case of certain of residents 53, such as elderly, disabled, and those with other special needs, property management system 10 may interact with care providers 63, especially in the context of the resident assistance subsystem 35 described hereinafter. Still further, contractors 65 and maintenance staff 67 may receive repair, replace, or other work or maintenance orders, and the like, as outputs from property management system 10, such as through move-in/move-out subsystem 21, as shown by the various connecting lines and arrows of FIG. 1.

In still further aspects, property management system 10 may access any number of databases, either located behind a firewall associated with property management system 10 or remote therefrom, such databases including an occupancy database 69, which may tally occupancy rates and related financial statistics, and in turn communicate certain financial data to an accounting function 71. Contractor 65 and maintenance staff 67 may, in certain implementations, selectively access and update a production schedule stored in a corresponding database 73.

Property management system 10 includes suitable processing capability, such a central processing unit, and suitable programming stored in a computer readable medium and comprising executable instructions capable of performing various functions and steps associated with property management subsystems 25. One or more user interfaces, whether aural/voice-based, or graphical, is shown schematically at 75 in FIG. 1. In the case of a graphical user interface, one or more associated user-viewable screens are associated therewith, for interacting with the personnel described above, especially property managers 55 and regional managers 57, who are generally supplying user input (through any suitable input device) for the associated property managing functions.

System 10 includes a library 77 which stores electronic files in a variety of forms and formats, as appropriate for operation of the subsystems 25 described herein. In general terms, electronic files include property data with records corresponding to a plurality of multi-unit dwellings 51, as well as the units and residents' names corresponding to respective rental units. The electronic files likewise include a variety of templates and records generated from such templates for corresponding subsystems, as detailed herein.

Library 77 may communicate selectively with databases, such as drop boxes, remote storage, and other storage medium, the foregoing shown schematically at 79. One or more functions of property management system 10 may be implemented by means of LAN, VPN, internet, cloud, or other distributed communication and transmission networks, as shown schematically by reference 81.

System Overview

Figure 2:
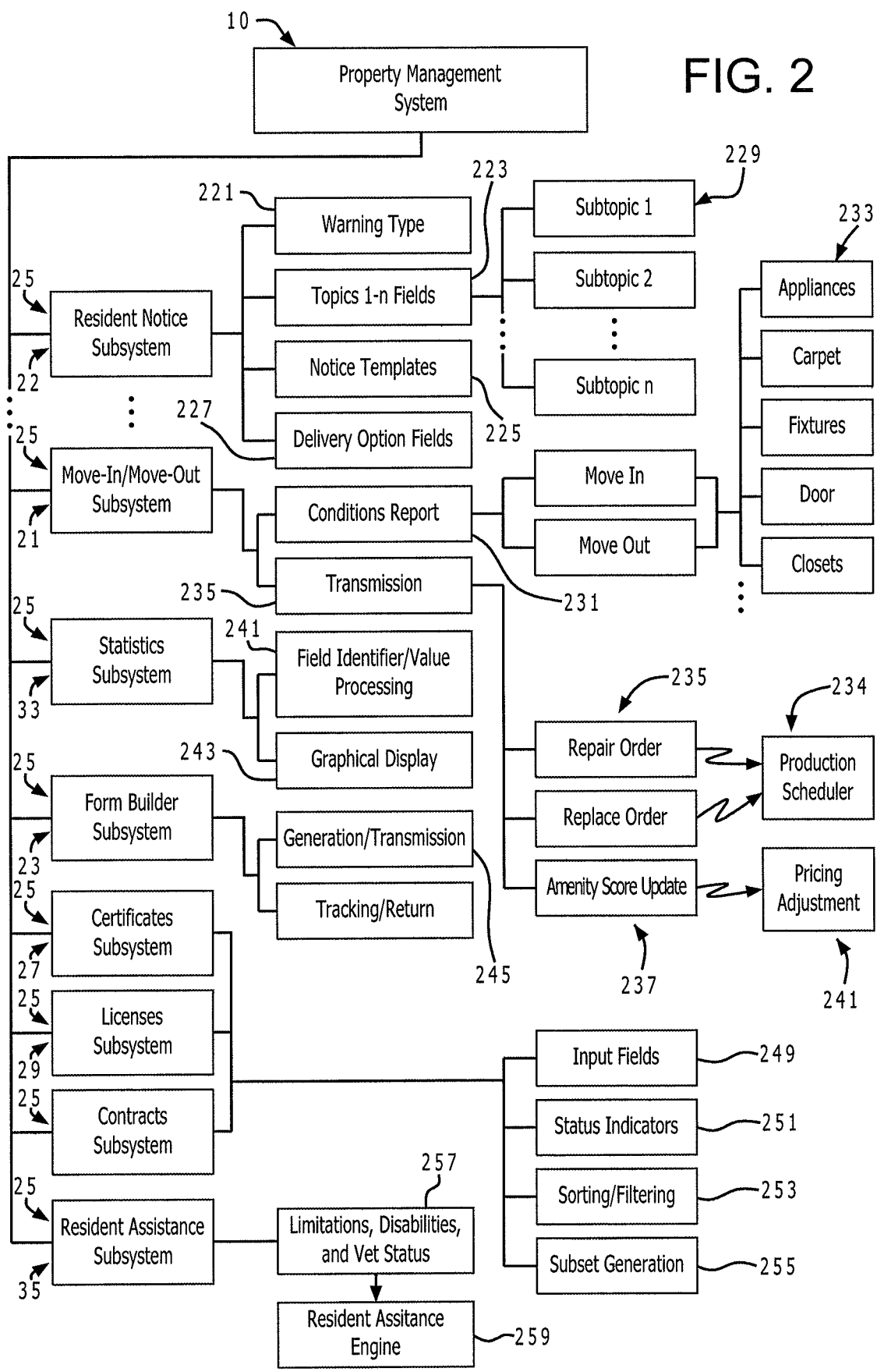
FIG. 2 is a program structure schematic of the system of FIG. 1.
Figure 3:
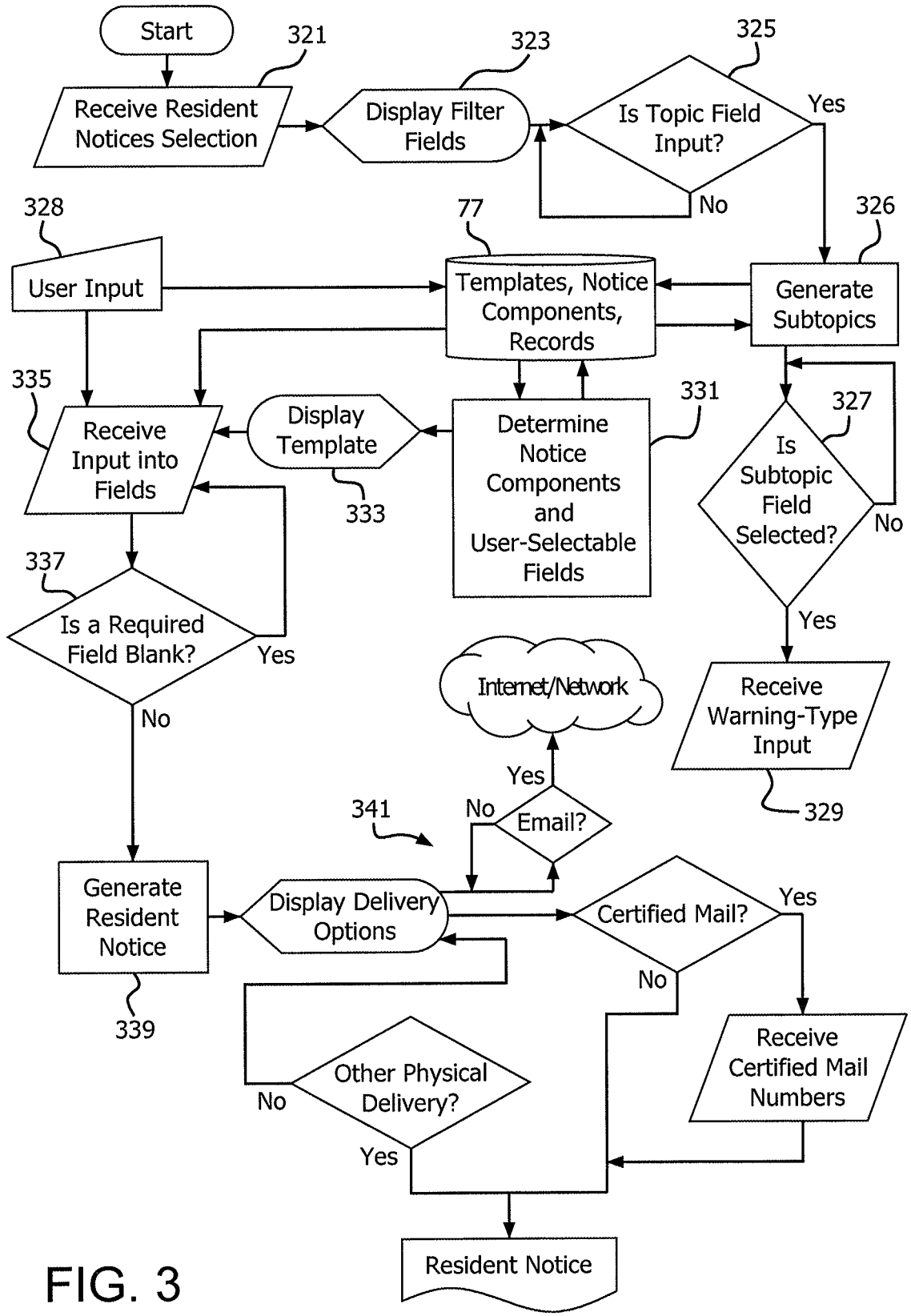
FIG. 3 is a flow chart of one possible implementation of a resident notice engine or subsystem of the current disclosure.

FIG. 2 shows a general function schematic block diagram of property management system 10 and its various subsystems 25, with suitable programming being associated with blocks to perform the functions associated therewith, the executable instructions, programming, or subroutines for performing such functions identified by reference numerals herein and shown in FIG. 2.

In particular, with regard to resident notice subsystem 22, suitable programming prompts the user, such as a property manager, to input a warning type (221), such warning type associated with a new resident notice being generated, such as first warning, second warning, final warning, and termination. Suitable programming likewise enables user input into topics for which the notice relates (223), and depending on topics selected (as well as subtopics discussed hereinafter), an associated one of the notice templates is generated and displayed (229) for further input and processing. Once a suitable topic has been selected or received by resident notice subsystem 22, follow-on programming generates a menu of user-selectable fields for input or selection of multiple subtopics relating to the selected topic (229). Upon generation of the resident notice, subsystem 22 enables input into various fields to specify how the notice shall be delivered (227), such as hand delivery, under door delivery, certified mail, and the like.

With regard to statistics subsystem 33, a stats reporting opening page is displayed by suitable programing and includes multiple statistics filter fields for sorting data in a database for generation of associated statistics. Suitable sorting can be performed by the type of document for which statistics are desired, such as building contracts, certificates, licenses, occupancy rate, and the like, those statistics can encompass all buildings, a selected building, or combinations thereof, and the types of contracts, certificates, or other documents being searched may likewise be specified by suitable input into corresponding statistics filter fields appearing on the graphical user interface.

In response to suitable user input, statistics subsystem 33 processes associated records, files, and identifiers associated with such records and files, as well as values which may be contained in the computerized records (241) and generates a graphical display of the statistics, such as pie graphs or bar graphs, such displays showing the results of the previously selected statistics filter fields such as contracts, certificates, or licensees divided by active, expiring, expired, including percentages, color indicators, and numerical totals of the contracts, certificates, licensees, or other documents which have been selected for statistical analysis by user activation of statistics subsystem 33.

With regard to form builder subsystem 23, once user input has been received to filter the data records in Library 77 by MUD 51 and Resident 53 (FIG. 1), a form field is displayed for receiving user input for a topic or type of form to be generated and transmitted (245). The general functions of form builder subsystem 23 may encompass communications from property management personnel 55, 57 to Resident 51 which require input from Resident 51 or completion of associated forms by such residents. For example, forms to be transmitted by the system to designated residents and which provide for inputting information from such residents and return, may involve bike registrations so that bikes on the premises of the MUD are appropriately accounted for, parking permit forms for the same purposes as discussed above for bikes, referral fees to current residents or through brokerages, rental credit involving specifics to be provided by the resident, waivers of liability in connection with tenant's use of facilities, abandoned property notices, bed bug treatment preparation forms, gathering of information relating to incident reports from residents, information required from residents to set up accounts or to facilitate other transactions relating to occupancy of the MUD by the resident, water pressure, surveys, or other tenant satisfaction surveys, and the like. Form builder subsystem 23 likewise includes suitable subroutines or other programs for tracking the generation of the appropriated form, its date of transmission, and return, as well as generating appropriate reminders automatically in the event the form is not returned by pre-determined deadlines (247).

Certificates subsystem 27, licenses subsystem 31, and contracts subsystem 29, operate through respective computer programming, subroutines, and other similar executable instructions (249) so as to display on a suitable graphical user interface data input fields, generally for completion by property management personnel 55 or regional managers 57. Input fields generated by programming at step 241 receive suitable input used to update or create records of certificates, licenses, and contracts, respectively for storage in appropriate files of the library or other associated data bases, including potential remote dropboxes or other cloud storage of such documents. Security for such documents is at a level appropriate to their sensitivity with regard to financial and other particulars associated with the MUDs 51 under management. Among the inputs received in creating records for certificates, licenses, and contracts are the expiration or renewal dates associated with such items, and suitable programming processes such expiration dates in order to generate status indicators (251), such status indicators as having a good "status" in terms of the expiration date, a soon-to-expire status, an expired status, and the like. Subsystems 27, 29, 31 likewise permit user-initiated sorting or filtering of associated records by any number of parameters, whether by building, status indicator, type of certificate, license, or contract, responsible individual, and other fields associated with the stored records of the certificates, licenses, or contract (253). The sorted or filtered records may likewise be further processed so that only a subset of the records satisfying the sort or filter criterium is generated and displayed (255).

With regard to move-in/move-out subsystem 21, once a rental unit associated with moving in and moving out has been suitably inputted, a template is retrieved from the library of property management system 10 and is displayed with various condition report fields for receiving input from the user, typically property management or staff, the input generally corresponding to amenities associated with the rental unit (231).

In one potential implementation, certain entries in the conditions report fields, such as an indication of a need for repair or replacement of an appliance, carpet, fixtures, door, or closets, may result in transmission of a repair or replacement order to the appropriate personnel or to a production scheduler having an associated database for scheduling repairs or replacements to apartment units (235). Move-in/move-out subsystem 21 likewise includes suitable programming such that an amenity score associated with moving in or moving out is updated based on user input (237) and, depending on change in the value of the amenity score, a pricing adjustment to the rental is made by associated programming (241).

The subsystems 25 shown schematically in FIG. 2 are able to be launched or otherwise initiated from a suitable electronic menu panel displayed on one or more screens of graphical user interface 75. User input corresponding to a selected one of the multiple property management functions of subsystems 25 is received, whether by selection or data entry. Thereafter, in the case of a graphical user interface for interface 75, suitable programming displays a series of user-perceptible screens corresponding to the selected subsystem.

Some or all of subsystems 25 are provided with programming which displays the series of screens in a predetermined or programmed order and thereby establishes for property managers 55 a consistent and corresponding work flow for the associated property management function or functions. In such implementations, a first screen of the series may be displayed for filtering property data stored in library 77 or otherwise associated with property management system 10. For example, one or all of the MUDs 51 managed by system 10 may be selected and upon such selection, the property data associated with corresponding records of the library is filtered. In certain implementations, the work flow restricts display of subsequent screens until after input has been received in the first screen and its associated filter field or fields.

With regard to resident assistance subsystem 35, input fields are generated to create records for residents who may have special needs arising either from physical disabilities, veterans status, or other impairments (257). Suitable input of limitations and disabilities may allow a resident assistance engine 259 to arrange transportation, care, or other accommodations, either in response to scheduled events, in response to entry of certain data, or on an ad hoc basis in response to input from property managers 55 and associated staff.

Figure 4:
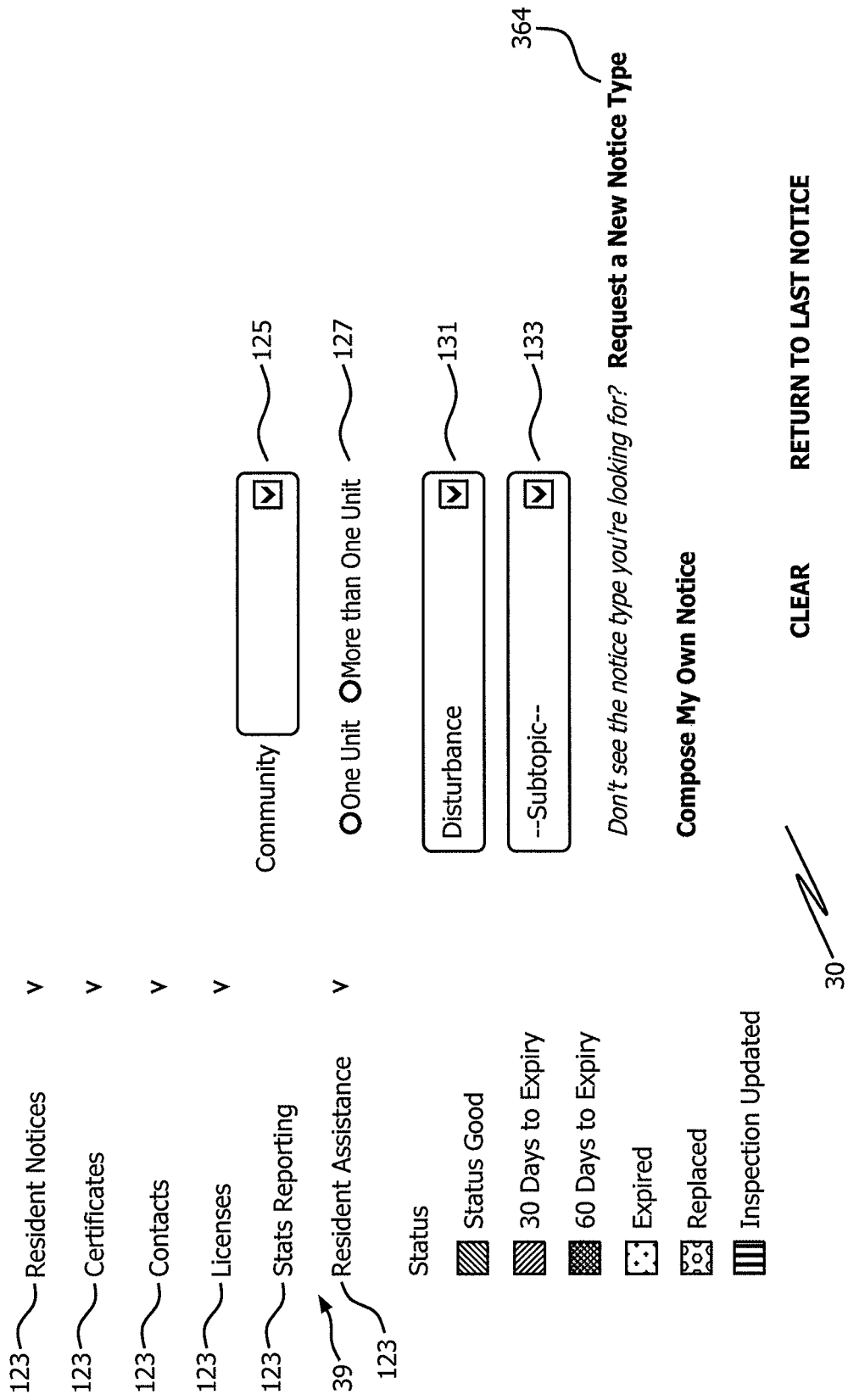

Referring to FIG. 4, suitable programming displays on opening page 30 a panel menu 39 having user-selectable fields 41 corresponding to subsystems 25 of system 10. In response to users' selection of one or more fields 41, system 10 executes instructions corresponding to launching or accessing of the selected subsystem(s) 25. Subsystems 25 accessible through fields 41 are identified with suitable corresponding indicia, such as Resident Notices 31, Certificates 32, Contracts 33, Licenses 34, Stats Reporting 35, Resident Assistance 36, and Status 37.

In response to user selection of fields 41 and execution of appropriate programming corresponding to the selected subsystem's, the graphical user interface of system 10 may display further user-selectable fields corresponding to the selected subsystem. In the implementation illustrated in FIG. 2, system 10 has responded to user-selection of Resident Notice indicia 31 to display further user-selectable fields 43.

Having described the user-activatable property management functions and associated subsystems 25 in general, operations and associated programming of particular subsystems will now be presented in more detail.

Resident Notice Subsystem

Referring now to FIGS. 1-7, subsystems 25 are launched or selected through a suitable screen of graphical user interface 75 shown in FIG. 4. A screen 30 includes a menu panel 39 running along the left portion of screen 30 with user-selectable panel options 123 corresponding to subsystems of property management system 10. A user-selectable field 122 corresponding to launching of resident notice subsystem 22 can be selected by suitable user input. Upon receiving input corresponding to selection of resident notice subsystem 22, suitable programming displays filter fields (step 323, FIG. 3). Filter fields include a first filter field 125, corresponding to a community, that is, one or more multi-unit dwellings 51 at a particular location. Field 125 may include a pop-up menu listing the set of communities or multi-unit dwellings 51 under management of property management system 10. In order to establish a work flow for the automated generation of resident notices using subsystem 22, further inputs into other filter fields of screen 30 are restricted until a selection is made for community filter field 125, which in turn then requires a selection of one unit or multiple units in associated unit filter fields 127. After completion of field 127, the user is required to associate a name of resident 53 and a unit. Thereafter, a topic filter field 131 is enabled for input, topic field 131 in this implementation comprising a selectable pop-up list which lists multiple selectable fields to which the resident notice to be generated may pertain. As illustrated in FIG. 4, one possible topic relates to a disturbance, and corresponding indicia are displayed upon user selection in topic field 131.

Resident notice subsystem 22 may be one of the subsystems of property management system 10, as in this implementation or, alternately, resident notice subsystem 22 may be a standalone computerized system for performing the functions of automatic generation of notices to residents of leased premises in one or more apartment buildings, as described generally above. In either implementation, topics are programmed into subsystem 22 and associated library records to encompass most if not all of the anticipated notices encountered during management of associated multi-unit dwellings 51. In this way, users such as property managers 53 are guided to standardized notice components and a prescribed, programmed set of options. On an exception basis, a user may launch programming to request a new notice type or compose a notice in free form (364).

Returning to the templates selectable from the computer-displayed list of topics, templates may be generated from a pop-up topic list upon selection of indicia, including: access needed, BBX grill not permitted, cleanliness issues, contact needed, damages, disturbance (shown after user-selection in FIG. 4), drugs/substance abuse, fire safety, improper use of amenities, improper use of apartment interior, improper use of facilities, non-approved persons, parking violation, non-approved pet, seeking information, stolen item, termination, trash.

Suitable programming responds to input of a related topic in field 131 (step 325, FIG. 3) and until the topic field has received input programming does not permit access to subtopic field 133. Subtopics are selectively displayable through a pull down menu. Library 77 includes records with identifies to associate each of the topics with a plurality of subtopics associated therewith. Programming limits further progress in the associated work-flow until suitable selection of a subtopic (step 327) from the corresponding list of subtopics generated after receiving topic field input (step 326). Input fields 125, 127, 131, and 135 may be displayed in any suitable visually perceptible manner through graphical user interface 75, in this case appearing in the right hand side of screen 30 as shown in FIG. 4.

Upon selection of one of the subtopics from subtopic field 133, the programmed series of steps associated with the work flow for generating notices requires designation of the warning-type, such as through a separate pop up window (step 329, FIG. 3), and the system restricts generation of the corresponding resident notice template until receiving the user input corresponding to the warning type field, that is, first notice, second notice, third notice, and the like. After suitable user input as to the warning-type in step 329, the system takes the various inputs into filter fields 125, 127, topic field 121, subtopic field 133, the warning type, and the corresponding notice template 135 and the notice components 137, along with the various user-selectable fields to be associated therewith, in step 331, and thereafter displays such template in step 333 along with user-selectable fields enabled for receiving input therein, whether by text entry or pull down menu selections, or in response to prompts, or other suitable input means (including written or oral). Notice template 135 has a plurality of notice components 137 displayed therein, notice components 137 being suitably associated for computer processing purposes with the notice template 135 by identifiers or other computer-related indications.

Figure 5:
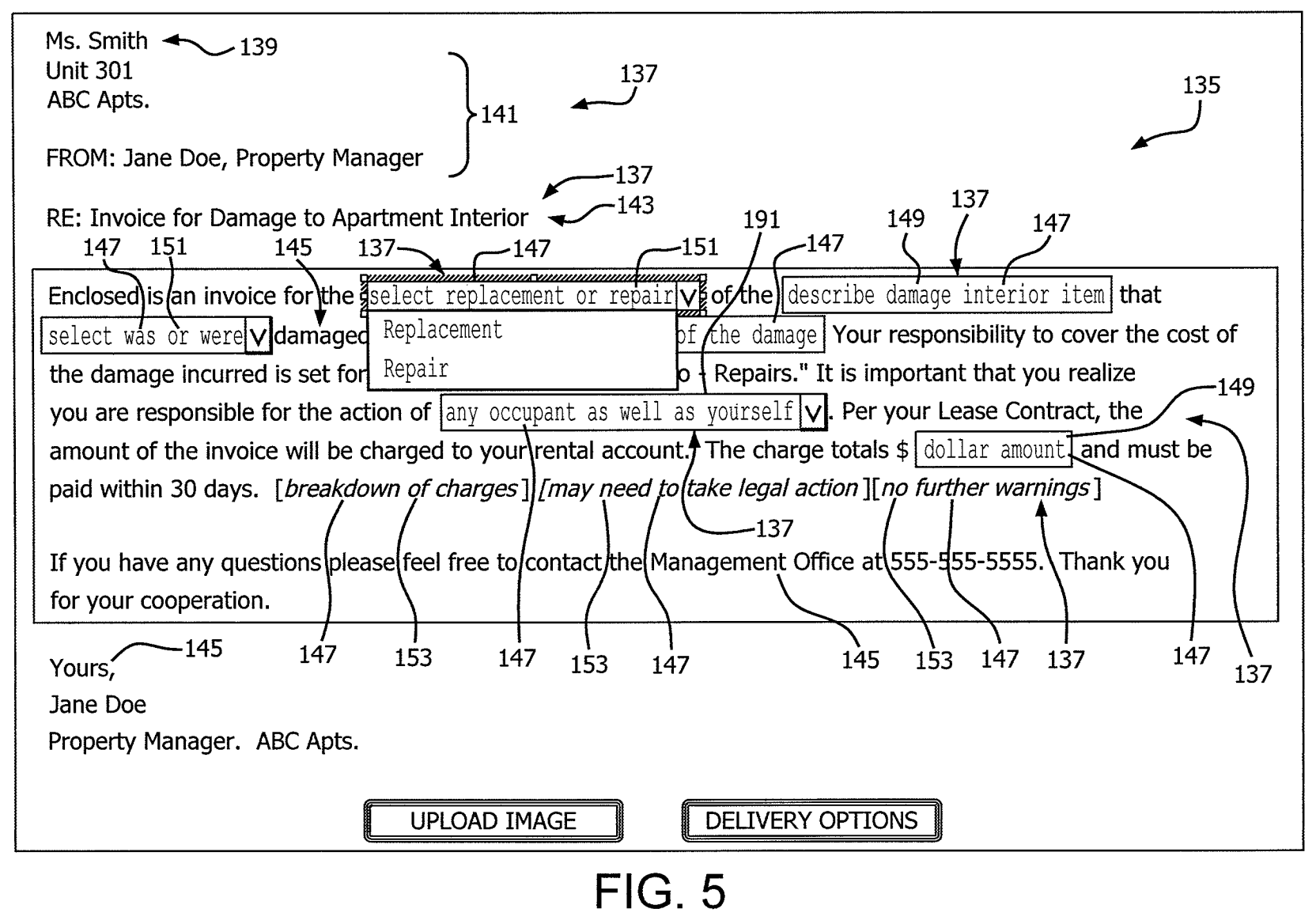

Having determined the notice components 137 and user-selectable fields of the template to be generated (step 331), the system displays notice template 135 through graphical user interface 75, such as on a computer generated screen, a screenshot of which is shown as FIG. 5. Notice components 137 include a resident name field completed by previous selection, such name field shown at 139, an address field 141, also prepopulated by virtue of previous selections in previous screens of the resident notice workflow, a subject line 143 (prepopulated) and a corresponding subtopic 135 previously selected in previous screens of the workflow.

Notice components 137 either themselves become part of the notice to be generated, or allow user selection or input to generate parts of the notice. As such, components 137 may include portions which are unalterable by the user, such as standard text blocks 145 shown in FIG. 5. Notice components 137 may further include user-selectable notice fields 147 suitably programmed to display prompts for user input and receive user input by either menu selection or keyboard or other input. Certain of user-selectable notice fields 147 include further prompts with text or other indicia 149, indicating to the user the nature of the input to be provided in the corresponding field 147, or selection indicia 151 indicating a selection the user is to make, such as through a pull down menu associated with the notice field 147. In this case selection indicia 151, when clicked by the user, reveals a drop down menu of two options to include the text of "replacement" or "repair."

User-selectable notice fields 147 may be located so as to be adjacent unalterable notice components, such as in this implementation, where selection field 151 has unalterable fields on either side.

User-selectable fields 147 may also include user-selectable zones 153 which correspond to optional text blocks 155 displayed upon selection, as seen in FIG. 6. These user-selectable zones 153 are suitably labeled with indicia to indicate the general subject matter of the corresponding text blocks displayable upon selection, in this case, for example, one block indicating "no further warnings shall be given," another text block indicating the possibility of legal action, and a third text block 155 corresponding to a breakdown of charges related to the damages of the interior of the apartment unit.

As seen in FIG. 6, text blocks 155 displayed in response to selection of zones 153 may themselves include further user-selectable subfields 157 for receiving input through keyboarding or user selections from a drop down menu, and the like.

Text blocks 147, as seen in FIG. 5, may relate to gender, tense, conjugation, and other grammatical aspects, an example of which is shown as selecting between the singular and plural for the past tense of the verb "to be," that is, "was," or "were,". This way, by way of example, standard text blocks may be used for either a male recipient, female recipient, or plural recipients, because such standard text blocks have been configured so that appropriate sentences have user selection of gender, tense, and singular/plural. In this way, standard text can be rolled out to assure a certain level of standardization among the notice components, while such standardization can be slightly modified to address the gender or number of recipients.

The resident notice subsystem 22, and any other subsystems of property management system 10, may include a system administrator interface with associated system administrator privileges. Such administrator may be able to change the texts of various notice components 137, may be able to likewise change which of user-selectable notice fields 147 are required to be completed before proceeding to the next screen or next programming steps, and may otherwise alter the notice templates 135 so as to fit the particular needs of one or more of the multi-unit dwellings 51. As such, a version of property management system 10 and associated electronic files of library 77 may include default text associated with notice components, may include default restrictions on users requiring completion of certain fields before proceeding to other fields, and may include a default listing of topics, sub topics, and the like. The ability to change such defaults may be restricted from users such as property managers 55 or regional managers 57; whereas, an administrator through an administrator's interface may be able to change such defaults so as to be appropriate and customized to the MUDs 51 and associated community.

Subsystem 22 for generating notices may likewise give property managers 55 the option of transmitting a notice generated through the workflow in draft form to one or more of the regional managers 57 with access to property management system 10. Suitable programming may automate notification, approval, or signoff by one or more of the regional managers 57, after which appropriate delivery of the notice thus generated by subsystem 22 may be performed.

Still further, in response to user selection of multiple units, notice subsystem 22 may include topics more akin to general announcements applicable to multiple buildings or communities, events, celebrations and the like, and corresponding templates 135 would be retrievable and subject to user generation using some or all of the functionality previously discussed with reference to individual unit notices.

Notices generated after operation of notice subsystem 22 are suitably stored electronically for access subsequently, such as in library 77 or suitable relational database. Metadata, pointers, fields or other indicators relate the notice generated to the resident(s) or occupant(s) concerned. In the case of a single notice to multiple units or residents, suitable pointers or other indicators associate such notice with each unit/resident or store a copy outright in each unit/resident file.

Furthermore, while certain examples have been given with respect to user-selectable zones 153 in relation to the topic identified by indicia "Damages," it would be appreciated that zones 153 may include any number of corresponding text blocks, including hints for the user to specify actions and consequences to the resident depending on the severity of the infraction or violation. Thus, for example, if access is required of a unit and was previously denied, the zone 153 may include suitable indicia so that the user may specify that a locksmith or other professional will be employed if access is once again denied. Other hints may involve billing the resident for such supplemental services if necessary. The zones 153 which are optionally added in the process of generating the notice may either be standard non-editable text, may have editable portions, or may be any combination of the foregoing, including dropdown menus and other user-selectable fields. Since these zones 153 are optional, as opposed to other notice components 137 which are not, suitable programming associated with zones 153 will permit a previously selected text block 155 associated with one of zones 153 to be deselected from inclusion in the notice being generated, such as by user selection or toggling of the appropriate one of zones 153.

In another variation of resident notice subsystem 22, a user who needs to create a notice may choose from pull down menu a topic labelled "Disturbance," (FIG. 4) the reason that the notice is being created. The "Subtopic" field 133 allows the user the discretion to add additional specificity as to the "Disturbance" by selecting, for example, "After Midnight" to the "Noise Complaint" section of the notice to the offending tenant that was selected.

If there is a request for resident cooperation, a range of consequences from mild to more serious are available to state in the case in which the resident does not comply with the notice as can be added by the user by accessing the language accessible through drop down menu 36. Additionally, the subsystem provides for more serious levels of tone in instances in which there may be a range of phrases or sentences to be applied to the situation at hand. The subsystem includes standard text from other types of notice (in instances of multiple or combined violations) as well as text from prior notices to the same resident.

The instant system includes a customization of voice when notices are to be directed to one of several residents in a unit or to all residents in the apartment complex. Other inclusions, such as a customized salutation or greeting, or a lighthearted closing reference to the state of the weather, can also be selected by the manager, such salutation, greeting, or closing either being selectable from multiple options or able to be inputted by suitable typed or spoken entry, and either editable or non-editable. Given the importance of striking the right tone with residents to assure smooth and efficient property management, the programming for those notice components 137 which are related to the notice salutation includes subroutines for accessing, when appropriate for the selected tone, resident/occupant first names for completing appropriate notice components. In the case of multiple addressees, the subsystem 22 is suitably programmed to be capable of listing multiple first names in adjacent, comma-separated fields. In this way, each resident receives a personal touch, if a light-hearted notice, or is placed "on notice" by specific first name, for more serious matters. Regardless, auto-filling programming of all resident names saves time in generating the notice.

In still other possible implementations, during one or more initial phases of creating a notice using notice subsystem 22, a pop up window or screen may be presented for user input, such input related to previous notices for the previously selected unit or resident that the user has selected to generate another notice for. So, for example, suitable programming may display notices for the same unit or the same residents either on the same topic, the same subtopic, or on other topics. The display of such related notices may likewise include programming to allow the user to cut and paste text from the previous notices into the current notice being prepared by the user, may permit certain user-selectable zones or fields on the current notice to be activated as a result of the previous notices, or may otherwise initiate options in the notice being generated which are associated with the existence of the one or more previous notices.

As part of notice generation or as a separate item selectable from menu panel 39 (FIG. 4), resident notice subsystem 22 may include a history of notices sortable and/or filterable by multiunit dwelling 51, resident 53, or one or more units associated therewith.

In still other possible implementations, the resident notice subsystem may make use of property data setting out residents, that is, signatories on leases, and occupants, that is, minors and other individuals occupying the leased premises. The names of occupants and residents may be displayed by suitable programming at one or more points during the notice generation workflow associated with resident notice subsystem 22. In this way, notices related to actions of occupants may be tailored to specify the identity of such occupants, while at the same time such notices may be directed to the responsible lease signors, that is, the residents whose names have also been made available for use by the user in generating the notice.

The resident notice subsystem 22 may likewise permit the selective attachment of external documents to any one of the notices to be generated, such external documents being attachable either through separate screens or pop-up windows, or by suitable fields within one or more notice components 137 or associated notice templates 135. Thus, for example, in the event of invoicing residents for damage, charges, or other services, associated back up in the form of third-party invoices or photos may be provided as needed, or associated documents for counter signature and return by such residents may likewise be provided. It will be appreciated that the foregoing exemplary attachments are just that, and other possible attachments are likewise within the scope of this disclosure.

After resident notice subsystem notice 22 receives user input into the various user-selectable notice fields 147 described above (step 335, FIG. 3), suitable programming may require user input in order to proceed, such as upon determining a required one of user-selectable notice fields 147 of notice template 135 remains blank. In the affirmative, in response to user attempts to generate the notice, a suitable visual indication is made that additional inputs into user-selectable fields 147 is required.

In the event all required fields have been completed, (step 337, FIG. 3), suitable programming generates the resulting notice in step 339 in electronic form 159, as shown in FIG. 7. Electronic notice 159 includes a display of outputs 161 and 163 corresponding to the inputs previously received by the system through user-selectable notice fields 147, whether such fields require text entry, menu selections, or added optional text blocks relating to certain subject matters (as in zones 153, FIG. 5).

After electronic generation of the resident notice in step 339, delivery options are displayed, such as through a pop-up window or series of screens, each having fields for user input corresponding to at least one delivery option. Thus, for example, one or more options of under-door delivery, hand delivery, regular mail, and certified mail may be selected in one of the initial delivery option user input fields. In response to selection of a certified mail option, the work flow may display a field requiring input of the certified mail number before proceeding further. Delivery option may likewise include email or print, in which case, in response to receiving user input, system 10 includes or has access to a printer driver and associated printer or an email system enabled to receive further user input as needed to transmit the resident notice by print or email, respectively.

Certificates Subsystem

Certificates subsystem 27, and its programming and associated work flow will be described with reference to FIG. 8. From the menu options from panel menu 39 (FIG. 4) upon receiving a user selection from panel options 123 corresponding to certificate subsystem 27, suitable programming receives the corresponding selection of the certificate subsystem in steps 821. When certificates subsystem 27 is operated by the user to enter data for certificates corresponding to one or more buildings, the system receives inputs via data entry fields to generate certificate records, including receiving a certificate expiration date (step 823). When sufficient inputs have been generated, as required by certificate subsystem 27, certificate records are created and stored in library 77 or other suitable database. Library 77 likewise includes one or more templates which may be displayed in conjunction with data entry fields in previous step 823, for establishing a corresponding workflow related to certificate entry.

Data entry fields which may be inputted into certificate templates or directly into library 77. Certificate records may include a certificate record identifier to associate a unique control number with the certificate, a certificate type such as fire extinguisher, elevator, standpipe and sprinklers, pool, boiler, fire alarm, and the like; data entry fields may likewise include a building, a date issued, the expiration date as previously mentioned, a first contact person, a second contact person, a responsible contractor, a specific unit description, that is, a building or other physical location corresponding to the certified unit. User inputs are associated with certificate field identifiers (e.g. headers) to create certificate records which can be systematically accessed, sorted for display, and otherwise processed by certificate subsystem 27.

One of the features of certificate subsystem 27 allows the computer to be operated in a manner to determine a status indicator for each of the certificate records having the expiration date field inputted (step 825). In this implementation, status indicators may relate to upcoming or actual expiration of a corresponding one of the certificates which is the subject of a certificate record accessible by certificate subsystem 27.

Subsystem 27 is operable in an improved manner to graphically display indicia on graphical user interface 75 corresponding not only to the certificate records, but to the status of such certificates, the display indicia including, for example, multiple, different color indicators corresponding to respective ones of the status indicators. In one possible implementation, when the certificate is in active status and expiration is not for several months, it may be associated with a color status indicator of green, indicating status good; likewise, if the system is 60 days from expiry, another color such as yellow, might be employed, if only 30 days from expiry, another differentiating color of orange may be generated as a status indicator, and if expired, a red status indicator is generated by the system. The system associates the color indicators with suitable information on the certificate, and users may select one or more of the status indicators to display only those certificate records corresponding to such status (step 827).

Figure 8:
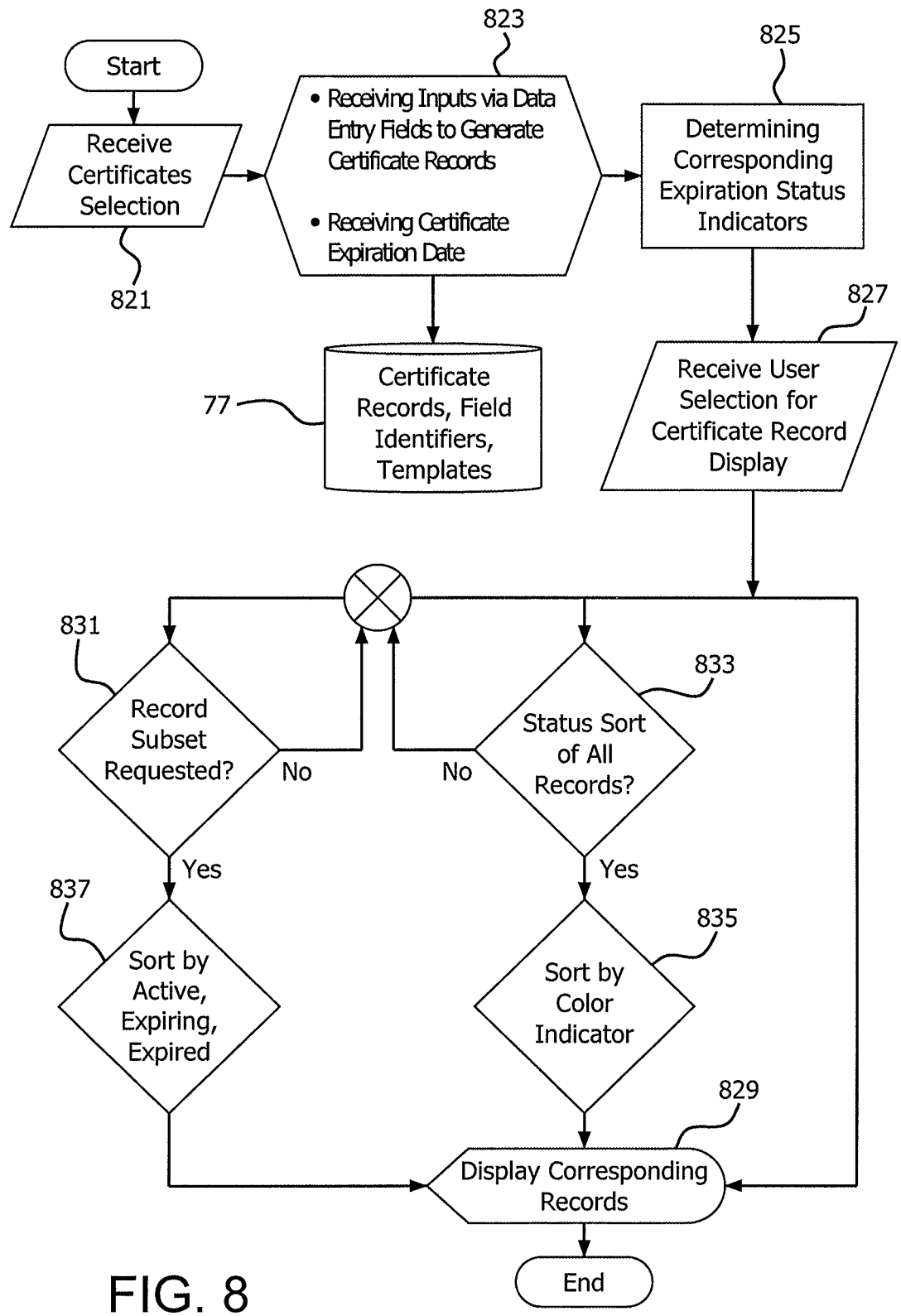
FIG. 8 is a flow chart of another possible implementation of a certificate engine or subsystem of the current disclosure.

The sorting, filtering, and selection of one or more certificate records by status indicator may assume any number of variations, as set out in FIG. 8, including displaying corresponding records as directly selected by the user (step 829) displaying a subset of the certificate records in step 831, such as by building, type (e.g., elevator, fire extinguishers, etc.), may sort all records across all buildings by the status indicator (step 833), may sort such records not only by status but by color (step 835), and may likewise sort by status the subset of records filtered in step 831, such sorting being by active, expiring or expired occurring in step 837. Sorting, filtering and other operations by the user are displayed in step 829 discussed previously.

Move-in/Move-Out Subsystem

Figure 9:
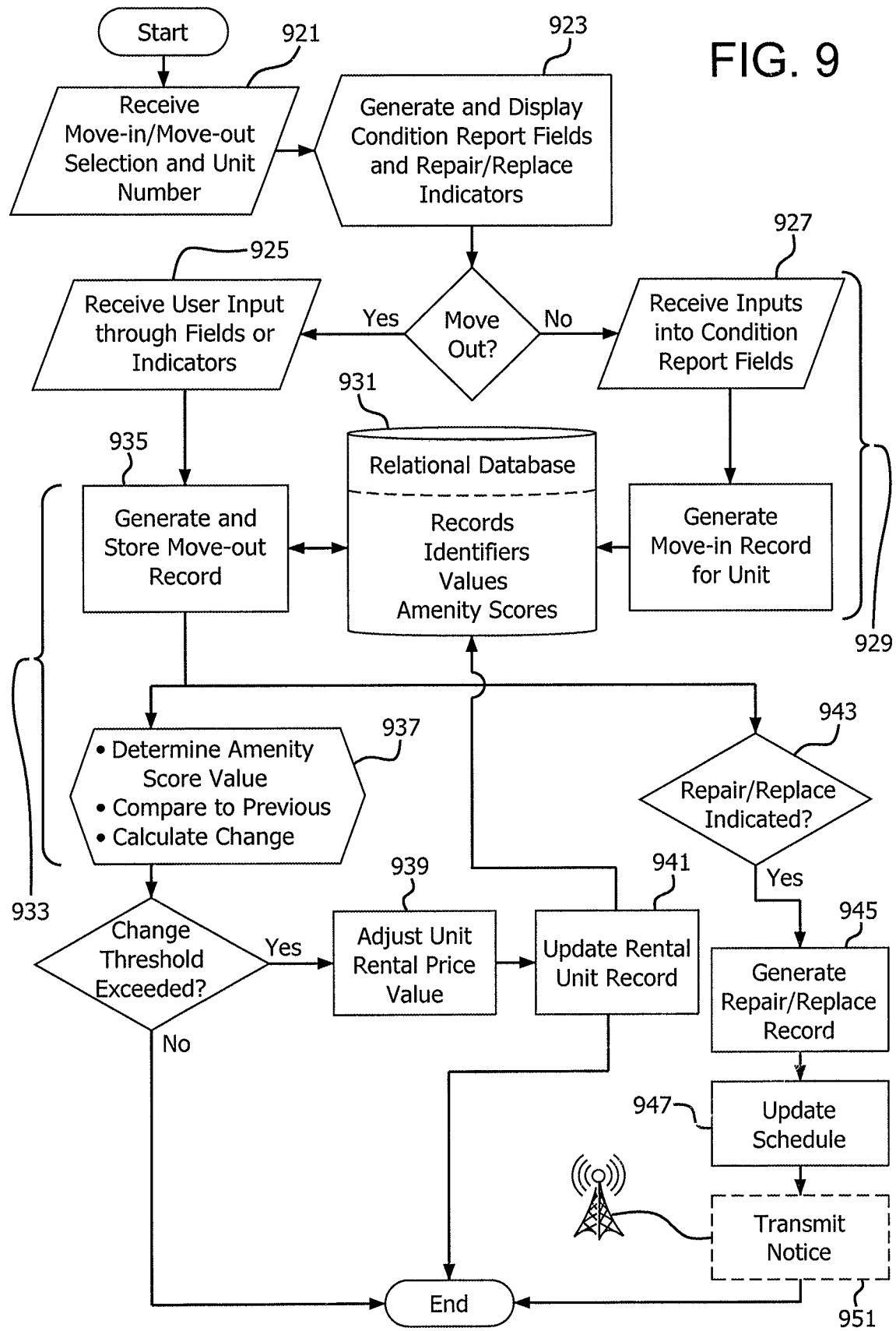
FIG. 9 is a flow chart of a move-in/move-out engine or subsystem of the current disclosure.

The move-in/move-out subsystem 21 will now be described in reference to FIG. 9. Move-in/move-out subsystem 21 receives indication that it was selected from panel menu 39 and further receives an associated input from the user corresponding to the unit number subject to the moving in or moving out workflow (step 921). After user selection of a selected one of the units, suitable programming generates and displays a move-in/move-out template on a suitable graphical user interface 75 (FIG. 1), whether on a tablet, personal electronic device, laptop, a desktop computer or other equivalent displays. It should be noted that reference to graphical user interface 75 does not preclude using other user interfaces, which are hereby defined to be included within the phrase "graphical user interface," such as a series of voice prompts or other auditory interfaces, and any number of devices for receiving user input into system 10.

In this implementation, graphical user interface 75 comprises a visual interface and includes condition report fields as part of conditions report template 231 (FIG. 2), the condition report fields being generated to receive user input, along with repair/replace indicators which can be user activated, as set out in steps 923 and 925 and 927. Condition report fields correspond to respective amenities of the selected one of the units, such as appliances, carpet, fixtures, doors, closets, and walls, as set out in the schematic of FIG. 2 at reference 233.

The conditions associated with these amenities are selectively reviewable by property managers or appropriate staff or subcontractors in connection with a move-in workflow shown generally at 929 and schematically at 235 (FIG. 2). After suitable data entries in template 231 corresponding to conditions report fields, a database 931, such as, by way of example only, a relational database, is used to store records, identifiers, score values, and resulting amenity scores associated with a move-in workflow 929. A record associated with the unit upon move-in may be accessed subsequently, such as upon initiation of move-out workflow, shown generally at 933 in FIG. 9 and schematically at 231 on FIG. 2. Alternately, subsystem 21 does not need to be accessed upon moving out, rather just for move-in purposes. For moving out, records of the conditions of the units, their amenities, and associated values and scores may be stored through a series of successive record generating steps upon move-out of residents from the corresponding units. In terms of the workflow of the move-out function 933, a condition report template 231 is pulled up in response to user request and receives input into condition report fields corresponding to various amenities of the unit being vacated.

Repair report indicators may be generated either in response to entry of sufficiently low values or other triggering indicia into the condition report fields of template 231 or, alternately, user may input or provide a check mark or other activation of a repair/replace indicator, specifying, as the case may be, whether repair or replacement is required for an associated condition or amenity. In terms of executing instructions for the move-in/move-out subsystem 21, upon entry of input into condition report fields in step 925, the move-out record is generated at step 935.

Upon generation of the record, further operations involve access to and storage in database 931. For example, once system 22 indicates that the user has completed condition report template 231, system 22 determines an amenities score value at step 937, and compares such amenity score value to previously stored amenity scores for the corresponding unit to determine the amount of any change. If a change in amenity score exceeds a certain threshold, the system may automatically, or in response to user prompting, adjust the unit rental price for the associated unit (step 939). The adjusted rental price may then be communicated to update the rental units record, which update in turn may be communicated to any appropriate database listing or tracking the units of the multi-unit dwellings 51 under management of system 10, such as network storage resources 81 or associated remote databases 79 accessed by other computer systems or other parties associated with MUDs 51 under management.

Amenity score determinations (positive, negative, or unchanged) are calculated as a function of the condition report fields and associated values previously entered. In this way, pricing of individual units 53 of multi-unit dwelling 51 (FIG. 1) may be more granular than without such input and reflect the presence of actual amenities, as well as the conditions of such amenities and of the apartment as a whole, such as walls, carpeting, wear and tear.

In the event subsystem 21 detects either repair or replacement has been indicated (step 943), a corresponding record is generated and may be communicated to effectuate the indicated repairs and/or replacements. When the phrase "repair/replace" or variations thereof is used, it is intended to be both conjunctive and disjunctive in terms of repairs and/or replacements of amenities and unit conditions). In one implementation, the subsystem 21 not only generates a repair/replace record, but updates a schedule accessible by maintenance staff, contractors or other parties involved in management and maintenance of the associated MUDs 51 and the unit needing repair/replace attention.

The generation of the repair/replacement record may also trigger transmission of an electronic notification to a portable electronic device (step 951) remote from the user interface of the property management personnel, or such may be triggered by user command. Such transmission of an electronic notification (step 951) can be rendered accessible to property maintenance staff and contractors.

Amenities Inspection Engine

In one possible implementation of property management system 10, the various programming described above for determining adjusted rental price as a function of amenity value or score may take the form of an amenities inspection engine having functions accessible together with or independently of other functions of move-in/move-out subsystem 21. The amenities inspection engine has suitable programming to receive input and process amenities-related data for a number of management purposes. One of such purposes includes logging or otherwise associating certain amenities with certain units in corresponding ones of the multi-unit dwellings User-viewable screens 175 generated by the amenities inspection engine are shown in FIGS. 10-13, and programming for performing the related amenities inspection inputs and processing are described below.

Among the computer implemented functions of the amenities inspection engine is programming for assessing, whether upon move-out or at any other suitable time, the presence or absence of certain identified amenities in units, so that such amenities can be listed, tabulated, advertised or otherwise made the subject of property management, repairs, replacements, and the like, and may likewise be used to adjust the unit rental price with a granularity associated with the presence or absence of such amenity.

Figure 10:
FIG. 10 is a screenshot generated by suitable programming of an amenities inspection engine according to one implementation of the current disclosure.

In one possible implementation, the amenities inspection engine makes use of a front-end module which receives user data inputs related to amenities of units, which amenities are recorded with the assistance of a user input screen 178 shown in FIG. 10. Input may be received during a walk-through of the physical unit corresponding to the selected unit or may be otherwise received and associated with a property data record of the unit. The amenities inspection engine makes use of a back-end module which processes data inputted from the front-end module for a variety of purposes associated with property management including, for example, the alteration of the rental price associated with the unit in which the amenity is present or absent. FIG. 11 shows one possible program implementation in which dollar values for added amenities are determined after amenity-related input at the front-end. One possible inputting method for amenities is by way of user selection from an amenities listing shown in FIG. 13 which in turn generates an amenities-to-be-added listing as shown in FIG. 10.

The amenities inspection engine selectively accesses an amenities database which has a plurality of amenity identifiers and amenity values associated with the amenity identifiers. Thus, for example, amenity identifiers may be labels describing the amenity, such as first-floor location of the unit, enhanced or gourmet kitchen, and any other suitable features which have been determined by property management to constitute part of the value of the rental unit, such as those shown in FIG. 13. The amenity identifiers are associated with amenity values, which, in this implementation, correspond to a dollar value or dollar amount associated with the amenity identifier.

As seen in FIG. 10, the front-end module of the amenities inspection engine is capable of displaying at least one existing amenity, in this case two amenities being shown with corresponding amenities indicia and an amenity value in the form of a dollar value associated with such amenity. A field 180 is displayed and programmed to be user-selectable. In response to user selection of field 180, a list of available amenities 182 (shown in FIG. 13) is displayed, such listing likewise being user-selectable by amenity and the corresponding indicia shown. In this implementation, programming of the front-end module allows multiple selections from the list of available amenities 182 to form a series of fields 184 comprising amenities to be added or missing amenities (FIG. 10). The display screens of FIGS. 10 and 13, in one possible implementation, may be displayed as part of a smart-phone app, and digital images may be associated with the added amenities listing or field 184, such as by clicking one or more picture-taking fields 186, accessing the smart-phone camera, and photographing the amenity to be added to the dwelling unit subject to amenities inspection.

The back-end module may not only determine an added amenity value corresponding to the added amenities uploaded to it from the smart-phone app and displayed in field 184, but such back-end module may likewise generate an adjusted unit rental price for the selected unit as a function of the added amenity value inputted by a user during the amenities inspection.

The added amenity values associated with the added amenities listing 184 in the front-end module are used by suitable programming, which may be at the back end, to update property data records associated with the selected unit which was or is subject to the amenities inspection.

Back-end programming may likewise sort and display multiple digital images, whether sorted or listed by amenity identifier, selected unit, and selected multi-unit dwelling. In other words, digital images of amenities may form a gallery which can be sorted for purposes of viewing detailed graphical or written information about amenities of a unit, without having to physically enter or inspect such unit. Likewise, the gallery of amenities images may be sorted into a report associated with the multi-unit dwelling or with the units and their particular associated digital images.

Figure 12:
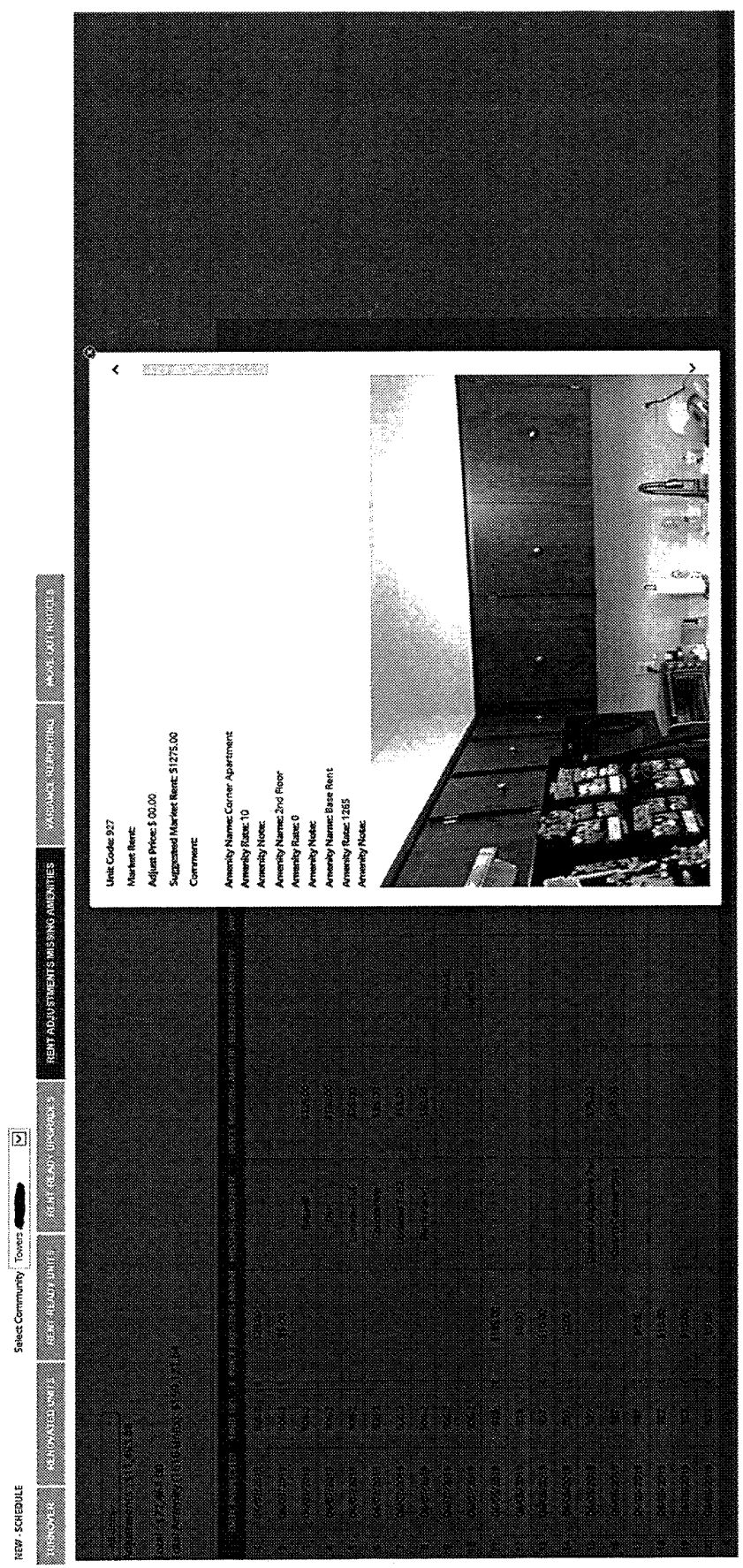
FIG. 12 is another screenshot of the programming associated with the amenities inspection engine of FIGS. 10-11.
Figure 13:
FIG. 13 is yet another screenshot generated by suitable programming of the amenities inspection engine of FIGS. 10-12.

FIG. 11 illustrates sorting and display of property data records including amenities-related data. For example, one tab, bearing indicia "rent adjustments/" missing amenities" may comprise data displayed from one of several programmed functions in property management system 10 disclosed herein. The sorting and display is in the form of a spreadsheet with user-selectable fields, certain columns identifying, respectively, existing amenity, the price of the existing amenity, missing amenities (that is, amenities added or to be added), the price of the missing amenity, any removed amenity and associated price thereof, adjustments as a result of added and existing amenities, total amenity value, the technician associated with the amenities inspection which yielded the amenity data, and user-selectable fields which generate reports with digital images associated with unit numbers. FIG. 12 illustrates user selection of one field or row of the displayed data showing the market rent for an associated unit and an adjustment of $10 associated by addition of the amenity corresponding to a corner apartment.

Processing examples thus encompass appropriate unit rental adjustments to reflect added or subtracted amenities, renovation and upgrade planning to add missing amenities to units that lack them, budgeting, and related financial adjustments either by dwelling unit or by multi-unit dwelling. The processing and reports illustrated herein are merely exemplary, and it will be appreciated that adding amenities or otherwise inspecting for the presence or absence of amenities and storing such information in property data records may be used for any number of property management functions and activities all of which are the subject of this disclosure, which is not limited to the examples or exemplary embodiments described.

Accordingly, it will be appreciated that still further processing of amenity identifiers and associated amenity values by the amenities inspection engine may be performed as dictated by the requirements and needs of the property management personnel using property management system 10 and its associated amenities inspection engine. Likewise, the terms "front-end" and "back-end" are meant to include the logical interrelationship of the former primarily but not exclusively receiving input whereas the latter primarily but not exclusively processes inputs or associated data. Thus there is no physical limitation requiring front-end or back end functionality and programming to reside at certain physical locations, whether near or far to dwelling units. Accordingly the property management system and amenities inspection module may include on-premise, cloud-based, SaaS, or any number of architectures or platforms and such various implementations are within the scope of this disclosure.

Contracts and Licensing Subsystems

Property management system 10 includes user-selectable panel options 123 to access, launch or otherwise initiate further property management subsystems than those described above, such as licenses subsystem 31 and contracts subsystem 29 as shown by indicia appearing in panel options 123, such subsystems shown schematically in FIG. 2. Similar to certificate subsystem 27, license subsystem 31 and contract subsystem 29 can receive property manager input through input fields 249, and thereby generate, sort or filter records, and store them in a suitable database, such as library 77 or networked or otherwise remote database resources 79, 81 (FIG. 1).

For contract subsystem 29, programming receives user input into suitable templates, user-selectable fields, or cells in spreadsheets, corresponding to one or more of the multiple unit dwellings, and comprising data entry fields which correspond to a contract account number, a contract type, a building, an origination date, a termination date, a renewal date, and a contact person. User input is associated with contract record identifiers to create the contract records in library 77 of system 10 or in other suitable database, and the identifiers in conjunction with the data associated with such identifiers permit subset generation 255 and sorting/filtering of records 253 (FIG. 2) as well as general access and other processing functions associated with records having field identifiers associated therewith.

Similar to the programming described with relation to certificate subsystem 27, contract subsystem 29 and license subsystem 31 can automatically or selectively determine one or more status indicators 251 for the contract records in this system having termination date fields inputted, contract status indicators relating to upcoming or actual expiration of contracts. Suitable status indicators can be devised for the contracts within the system and can include color indicia of green, orange, yellow, red, blue, and brown, corresponding to statuses of good, 30-day-to-expiration, 60-day-to-expiration, expired, replaced, and updated inspection, respectively, similar to those related to the certificate subsystem 27. Programming can be provided for sorting and filtering by color indicators or if not present, by status indicators. Subsets of one or more of the contract records may be generated, whether by status indicator, or by other data input field or identifier, such as the contract type, building, or contact person.

The foregoing discussion of certificate subsystem 27 and contract subsystem 29 applies with regard to the programming for license subsystem 31. The instructions for license subsystem 31 generate suitable input field 249, status indicator 251, sorting and filtering capabilities 253, and subset generation 255, handling records associated with licenses so that they can be processed and suitably analyzed separate from certificates or contracts.

Statistics Subsystem

Property management system 10 includes suitable programming to generate statistical outputs through statistics subsystem 33, by processing fields and identifiers of resident notice records, resident assistance records, move-in/move-out records, certificate records, contracts record, and license records. Processing of one or more of the foregoing categories of records may generate any number of visual outputs, such as a pie graph, a bar graph, or listings on a graphical user interface and such outputs can be further sorted or tailored in order to assist property managers 55, regional managers 57, or other personnel associated with management of multiple-unit dwellings 51. As just one example, the statistical outputs may comprise pie graphs of certificate records grouped by status indicator, and may include suitable programming for generating percentages for display so as to indicate what amounts of certificates are within particular status categories and might require attention.

Resident Assistance Subsystem

Another aspect of property management system 10 relates to optimizing or more efficient management of assistance to residents of MUDs 51, when such residents are physically challenged, disabled, have other disabilities. Also, some residents may have statuses entitling them to certain services, such as a veteran's status and associated support for such veterans. Resident assistance subsystem 35 includes suitable programming to perform such functions. In one possible implementation, user input is received by resident assistance subsystem 35 through resident assistance fields in a template displayed on a graphical user interface, such input relating to limitations, disabilities, veteran's status, and other special needs of the residents which require coordination, scheduling, or involvement by management personnel for the MUDs 51. Suitable programming in the form of a resident assistance engine may then selectively access the records of residents requiring assistance as previously generated in step 257, such resident assistance engine 259 having functions to permit scheduling of disability accommodations, transportation, and even accessing care providers 49 to arrange appointments, home visits, and other services associated with infirmities, limitations, retirement, disabilities, or veteran's status. As just one example, the resident assistance engine 259 may be suitably configured to transmit an electronic notification to a portable electronic device remote from the graphical interface of the property management subsystem 10 and accessible to the aforementioned care providers, and also accessible to transportation personnel for the disabled, or veteran's benefits coordinators.

Forms Subsystem

The form builder subsystem 23 allows management of more routine interactions between property management managers 55 and residents 53 of MUDs 51. Some of the interactive functions that can be handled through form generation, transmission, and return may include parking permit forms, physical assistance during exiting, bike registration forms, goodwill concessions to residents, customer care cards, soliciting input relating to incidents, forms relating to setting up resident accounts, rent credit forms, replacement key forms, and any number of surveys. Form builder subsystem 23 may include subroutines or modules that enable property managers 55 to "build" forms, that is, create electronic templates to be used in any of the foregoing interactions with residents 53, or to devise new ones as required.

As such, a tenant form library having multiple tenant forms related to the property management of MUDs 53 may be suitably stored and accessible, updatable, and sortable. The tenant form library, when accessed and displayed, may have tenant input fields for receiving input not necessarily from property managers 55, but from residents (tenants) 53. The forms having fields for tenant input may also include tenant selectable links. A user such as a property manager 55 may build a form or generate a form from the existing tenant form library and associate it with a particular tenant to receive the tenant form. So, for example, in the case of needing a bike registration, a communication is generated consisting of a tenant form with text inviting the tenant to complete a bike registration form.

The system generates a template or form letter, but the form letter has fields for displaying input from property managers in predefined areas to create a personalized communication to the tenant by name, but likewise has unalterable portions (similar to the resident notice subsystem 22), which may relate to an explanation or the purpose of the selected form. In one possible operation, a forms menu is displayed showing all of the available forms to a user such as property manager 55, and the property manager is able to select from the menu an appropriate one of the multiple tenant forms available. The intended recipient of the form is populated in the appropriate fields when the selected form is displayed for the property manager 55.

In the case of emailing the tenant form, the communication may include a link embedded within the communication to enable the tenant to selectively access the corresponding form which the resident manager has invited the tenant to complete and return. The system enables linking to the selected one of the tenant forms, and such tenant forms may be either stored within library 77 or any of the other data sources 79, 81, or may transfer the tenant to any third party website. In the case of a tenant form stored within property management system 10, suitable programming enables electronic input by the tenant into the tenant form to create a completed tenant form and, thereafter, the system is programmed to enable electronic receipt of the completed tenant form. Given that form builder subsystem 23 may be selectively accessed by tenants or tenant forms, in one implementation as shown in FIG. 1, a firewall insulates form builder subsystem 23 from other functions of property management system 10.

To assure smooth processing of routine communications through form builder subsystem 23, functions may be programmed to record the date that a property manager 55 generates the particular communication to the tenant, may generate a follow-up date to such communication, and may determine when the follow-up date is close or has arrived, and communicate a reminder to either the property manager to follow-up, to instruct the tenant to return the form, or both.

Forms subsystem 23 may likewise include forms which permit transmission to medical professionals, such as a pet owner form seeking vaccination information from a veterinarian. Forms may be sent to residents for completion, and such residents in turn, may electronically transmit forms upon completion to a third party and make use of electronic document signature programs or other functionality to get the document signed and returned by the third party to the resident, in turn having such signed form returned to the resident manager, all through various programming of form building subsystem 23. As another example, in the event special access, medical or other special accommodations require physician sign-off, forms subsystem 23 may function as described above to permit generation, transmission, or return of relevant forms, signatures, information, and the like. Current or prospective residents may likewise be provided access to subroutines with forms subsystem 23 to forward or distribute lease or other occupancy related documents for signature or completion by co-tenants, occupants, roommates, etc., and to track the return of such documents.

Computer System Hardware and Software

System 10 may be implemented on any suitable computer platform, using either stand-alone or networked architecture. In one version, there may be one or more of the subsystems 25 stations in communication with a database or other data storage means, one or more servers or processors, either through a local-area or wide-area network. A client-server architecture using the world-wide web may also be used. In the event computer work-stations are involved, whether as stand-alone versions of system 10 or as housing subsystems 25, such workstations may comprise a computer system which includes a processor (e.g., a central processing unit (CPU), a graphics processing unit (GPU, or both), a main memory and a static memory, which communicate with each other via a bus. The computer system may further include a video display unit (e.g., a liquid crystal display (LCD), a flat panel, a solid state display, or a cathode ray tube (CRT)). The computer system may include an input device (e.g., a keyboard), a cursor control device (e.g., a mouse), a disk drive unit, a signal generation device (e.g., a speaker or remote control) and a network interface device.

The disk drive unit may include a machine-readable medium on which is stored one or more sets of instructions (e.g., software) embodying any one or more of the methodologies or functions described herein, including those methods illustrated above. The instructions may also reside, completely or at least partially, within the main memory, the static memory, or within the processor, or a combination thereof, during execution thereof by the computer system. The main memory and the processor also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs in the broad sense to include, without limitation, computer coding, microcode, firmware, or other programming, such software running on a computer processor or other microprocessor. Furthermore, software implementations can include distributed processing or component/object distributed processing, parallel processing, or virtual machine processing can also be constructed to implement the methods described herein. The instructions may further be transmitted or received over the communications network via the network interface device.

While the machine-readable medium is in the singular, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Accordingly, the specification and drawings are to be regarded in an illustrative rather than a restrictive sense.

In addition to the advantages apparent from the above description of property management system 10 and its various subsystem 25, one of the advantages of property management system 10 is that, on the one hand, the system includes a programmed series of screens for user input, which assures that all required information relating to a management function has been received and recorded into the system. On the other hand, the input guided by the programmed screens into the standardized templates has built-in options and flexibility so that, while the programming guides users to input required information, they may nonetheless select from menus or prompts which input is most appropriate for the particular circumstances. In this way, management of multiple unit dwellings is both standardized and made more comprehensive by requiring certain types of inputs, and yet may be particularized. The result is a more optimal and better tailored set of workflows for a defined set of property management functions.

Another advantage to system 10 is the time savings for property managers to readily see work, forms, notices, and other communications which do not require the user to "start from scratch," but yet allow the user to customize as needed.

Still another advantage is that the unalterable fields of text associated with communications with residents 51 establish a consistent tone, depending on the severity of the situation and other factors, so that, regardless of which resident manager may be generating the communication, the "voice" of the community is consistent. So, for example, given that it is often desirable to project a welcoming positive tone to residents, notice templates and other communications within the system may be written with that in mind to be used by the entire set of property managers, resulting in conveying the same warm, welcoming tone. Conversely, in the event of serious breaches or other troublesome aspects of property management, an appropriate legal tone may be created and used consistently.

Another of the many advantages to the system is assuring and optimizing compliance with any number of certificates, licenses, inspections, ADA, or other requirements, as deadlines, expiration dates, and scheduling, have been automated.

These and other advantages may be apparent from the disclosure herein, and the claims appended below.

What is claimed is:

1. A system for managing multiple, real properties comprising a plurality of multi-unit dwellings, the system comprising:
   a central processing unit;
   a computer program stored in a computer readable medium;
   a graphical user interface having a user-viewable screen associated therewith; and
   a library of electronic files, wherein the electronic files include:
   property data records corresponding to a plurality of multi-unit dwellings, a plurality of units in the multi-unit dwellings, and residents' names corresponding to respective ones of the units;

a plurality of templates retrievable from the library to generate the records for the multi-unit dwellings, the templates corresponding to property management functions;

wherein the programming includes executable instructions capable of performing the following computer-implemented steps:

receiving user input to launch at least one property management subsystem corresponding to the property management functions for any one of the multiple properties, the at least one property management subsystem including a move-in/move-out subsystem, a statistics subsystem;

displaying on the screen an electronic menu panel having menu options corresponding to respective ones of the property management functions associated with the electronic files;

receiving user input corresponding to a selected one of the multiple property management functions;

displaying a series of screens corresponding to the selected property management functions in a programmed order to establish a corresponding workflow for a user;

displaying a first screen of the series, wherein the first screen has at least one user-selectable filter field;

in response to user input associated with the filter field, filtering the property data to associate portions of the property data in the library with the selected property management function; and restricting display of a second, subsequent screen until input has been received corresponding to user selection of the at least one filter field;

wherein the move-in/move-out subsystem has a relational database having a plurality of move-in/move out identifiers and a plurality of dwelling unit values stored therein, the identifiers including a building identifier, an occupancy status identifier, a unit identifier; the values comprising a unit number, and a corresponding unit rental price;

the property management system further comprising an amenities inspection engine;

wherein the amenities inspection engine comprises a front-end module to receive user data inputs related to amenities of the units and a back-end module for processing the data inputs to alter the unit rental prices for the dwelling units corresponding to the data inputs; and an amenities database having a plurality of amenity identifiers and amenity values associated with the amenity identifiers;

wherein the front-end module includes programming capable of performing the following steps for a selected one of the units:

a. displaying at least one of existing amenities indicia and missing amenities indicia corresponding to the amenity identifiers and the amenity values;

b. in response to user selection of an add-amenities field, displaying a user-selectable list of available amenities;

c. receiving user input corresponding to one or more selections from the list of available amenities;

d. generating an added amenities listing corresponding to the user input;

e. associating digital images with the added amenities listing; and wherein the back-end module includes programming capable of performing the following steps for the selected one of the units:

a. determining an added amenity value corresponding to the added amenities listing;

b. generating an adjusted unit rental price for the selected unit as a function of the added amenity value;

c. updating the property data record to include the adjusted unit rental price;

d. sorting and displaying the digital images by amenity identifier, selected unit, and selected multi-unit dwelling;

e. generating user-selectable reports of amenities for any one of the selected units of any one of the multi-unit dwellings;

f. receiving amenity inspection records corresponding to the date, time, and inspector associated with the step of updating the property data record to include the adjusted unit rental price;

g. determining by time period or by total a numeric value associated with the amenity inspection records; and h. displaying output generated from performance of any of the foregoing processing steps for display on the user-viewable screen, the output being in user-selectable form.

2. The system of claim 1, wherein the step of associating the digital images with the added amenities listing includes generating the digital image by photographing an actual amenity present in a physical dwelling unit corresponding to the selected unit.

3. The system of claim 2, wherein the front-end module comprises a Smart-phone app and the step of photographing the actual amenity comprises user selection of a picture-taking field associated with the added amenities listing.

4. The system of claim 2, wherein said amenity identifiers are labels describing amenities of said dwelling units.

5. The system of claim 4, wherein said amenities are selected from a group consisting of: first-floor location of said dwelling unit; second-floor location of said dwelling unit; furnished apartment; enhanced kitchen; gourmet kitchen; galley premium kitchen; lindy kitchen; plank flooring; plank floors; quartz countertops; smoke free building; top floor, updated appliance package; corner apartment; balcony; updated tub; den; rehab; and view.

6. The system of claim 5, wherein each of said amenity identifiers is associated with an amenity value.

7. The system of claim 1, wherein said amenities identifiers are labels describing amenities of said dwelling units.

8. The system of claim 7, wherein said amenities are selected from a group consisting of: first-floor location of said dwelling unit; second-floor location of said dwelling unit; furnished apartment; enhanced kitchen; gourmet kitchen; galley premium kitchen; lindy kitchen; plank flooring; plank floors; quartz countertops; smoke free building; top floor, updated appliance package; corner apartment; balcony; updated tub; den; rehab; and view.

9. The system of claim 8, wherein each of said amenity identifiers is associated with an amenity value.

10. The system of claim 1, wherein said amenities are selected from a group consisting of: first-floor location of said dwelling unit; second-floor location of said dwelling unit; furnished apartment; enhanced kitchen; gourmet kitchen; galley premium kitchen; lindy kitchen; plank flooring; plank floors; quartz countertops; smoke free building; top floor, updated appliance package; corner apartment; balcony; updated tub; den; rehab; and view.

11. The system of claim 1, wherein said amenities inspection engine includes architectures or platforms selected from the group consisting of: on-premises platforms; on premises architectures; cloud-based architectures; cloud-based architectures; software as a system platforms; and software as a system architectures.

12. The system of claim 1, wherein said programming of said back end modules is capable of performing the steps of:
processing said list of available amenities and said added amenities listing in order to generate copy for advertising; and
processing said list of available amenities and said added amenities listing in order to generate orders for repair and replacement of said amenities.

13. The system of claim 1, wherein said programming of said back end modules is capable of performing the steps of:
forming a gallery of said digital images of amenities; and
sorting said gallery to allow for viewing of detailed graphical and written information about amenities of a user selected dwelling unit.

14. The system of claim 1, wherein said plurality of templates include notice templates corresponding to respective resident notices to be generated and notice components to be included in the notices;
wherein the notice components and the templates include notice identifiers to associate at least one of the notice components with one or more of the notice templates;
wherein the templates include pre-determined user-selectable fields corresponding to at least some of the notice components; and
wherein said at least one property management subsystem further includes a residential notice subsystem, a certificates subsystem, a licenses subsystem, a contracts subsystem, and a residential assistance subsystem; and
wherein said computer-implemented steps further includes:
after selection of the menu option corresponding to the residential notice subsystem, displaying the notice components in the form of (1) standard text unalterable by the user; (2) populated text displayed in predetermined zones of the template; and (3) the user-selectable fields of the template.

15. The system of claim 14, wherein said dwelling unit values of said relational database of said move-in/move/out subsystem further includes an amenity score; and
wherein said move-in/move-out subsystem comprising computer programming with executable instructions capable of performing the following computer-implemented steps:
displaying a move-in/move-out template after user-selection of a selected one of the units;
storing an initial amenity score for each of said units in a relational database, said initial amenity score based on amenities comprising carpeting, appliances, fixture, doors, and closets for each of said units;
generating and displaying condition report fields associated with the move-in/move-out template, the condition report fields corresponding to amenities of the selected one of the units comprising carpeting, appliances, fixtures, doors, and closets, and at least one repair/replacement indicator corresponding to one of more of said amenities,
receiving user inputs by means of the condition report fields;
associating at least one of the identifiers with the inputs to create a move-in/move-out record;
storing the move-in/move-out record in the relational database;
in response to receiving repair/replacement input corresponding to at least one repair/replacement indicator, generating a corresponding repair/replacement record to update a computer-implemented production schedule of repairs or replacements, updating a schedule accessible by the group comprising maintenance staff, contractors, and other parties involved in management and maintenance of said units, and transmitting, after generation of said repair/replacement record and said updating, at least one electronic notification wirelessly to at least one remote member of said group in order to facilitate remote repair/replacement at said unit and remote from the user interface timely in accordance with said schedule;
determining an updated value of said initial amenity score after receiving input into the condition report fields and based on said condition report fields;
comparing said updated amenity score to said initial amenity score of the selected unit to determine the presence and amount of a change in the value of the amenity score;
in response to detecting the amount of the change in the value of the amenity score exceeding a predetermined threshold, adjusting positively or negatively the amount of the unit rental price as a function of the amount of the change in the value of the amenity score, whereby pricing of individual ones of the units of the multi-unit dwelling is based on the inputs into the condition report fields; and
in the event of an adjustment in the rental price from the preceding step, updating a rental unit record corresponding to the selected unit.

16. The system of claim 14, wherein said resident assistance subsystem comprises computer programming with executable instructions capable of performing the following computer-implemented steps:
displaying on the graphical user interface a template having resident assistance fields to receive user input;
wherein the resident assistance subsystem comprises a resident assistance engine for scheduling disability accommodations in response to the received input in the residence assistance fields; and
transmitting an electronic notification to a portable electronic device remote from the graphical user interface of the property management subsystem and accessible to at least one of the group consisting of medical practitioners, transportation personnel for the disabled, and veterans' benefits coordinators.

17. The system of claim 14, wherein said certificate subsystem includes executable instructions capable of performing computer-implemented steps comprising:
receiving user input into certificate templates for a plurality of the multiple unit dwellings in data entry fields, wherein the data entry fields the include a certificate record identifier, a certificate type, a building, a date issued, an expiration date, a first contact person, a second contact person, a system unit description, and a responsible contractor;
associating the user input with certificate field identifiers to create certificate records in the library of the system;
determining a status indicator for each of the certificate records having the expiration date field inputted, the status indicators related to upcoming or actual expiration of a corresponding one of the certificates;
enabling the display of indicia on the graphical user interface corresponding to the certificate records, the indicia including multiple, different color indicators corresponding to respective ones of the status indicators;

wherein the programming for enabling the display of indicia of the certificate records includes enabling selective display of subsets of the certificate records, the subsets including active certificates, expiring certificates, expired certificates, and inspected certificates;

wherein the programming for enabling the display of the indicia of the certificate records includes sorting the certificate records by the status indicators to enable the display of certificate records by status indicator associated therewith; and enabling display on the graphical user interface by the color indicators corresponding to the certificate records.

18. The system of claim 14, wherein said contracts subsystem includes executable instructions capable of performing computer-implemented steps comprising:
   a. receiving user input into contracts templates for a plurality of the multiple unit dwellings in data entry fields, wherein the data entry fields correspond to a contract account number, a contract type, a building, an origination date, a termination date, a renewal date, and a contact person;
   b. associating the user input with contract record identifiers to create contract records in the library of the system;
   c. determining a contract status indicator for each of the contract records having the termination date field inputted, the contract status indicators related to upcoming or actual expiration of the contract;
   d. enabling the display of indicia on the graphical user interface corresponding to the contract records, the indicia including multiple, different color indicators corresponding to respective ones of the status indicators;
   wherein the programming for enabling the display of indicia of the contract records includes enabling selective display of subsets of the contract records, the subsets including active contracts, expiring contracts, expired contracts, and replaced contracts; and
   wherein the programming for enabling the display of the indicia of the contract records includes sorting the contract records by the status indicators to enable the display of contract records by status indicator associated therewith, and enabling display on the graphical user interface by the color indicators corresponding to the contract records.

19. The system of claim 14, wherein said licensing subsystem comprises executable instructions capable of performing the following computer-implemented steps:
   a. receiving user input into licenses templates for a plurality of the multiple unit dwellings in data entry fields, wherein the data entry fields correspond to a contract account number, a contract type, a building, an origination date, a termination date, a renewal date, and a contact person;
   b. associating the user input with contract record identifiers to create contract records in the library of the system;
   c. determining a contract status indicator for each of the contract records having the termination date field inputted, the contract status indicators related to upcoming or actual expiration of the contract;
   d. enabling the display of indicia on the graphical user interface corresponding to the license records, the indicia including multiple, different color indicators corresponding to respective ones of the status indicators;
   wherein the programming for enabling the display of indicia of the license records includes enabling selective display of subsets of records associated with licenses, the subsets including active licenses, expiring licenses, expired licenses, and replaced licenses:
   wherein the programming for enabling the display of the indicia of said records includes sorting said records by the status indicators to enable the display of contract records by status indicator associated therewith, and enabling display on the graphical user interface by the color indicators corresponding to said records.

20. The system of claim 14, wherein the system includes executable instructions for enabling performance of the computer-implemented steps of processing at least one of the following types of records: the resident notice records, the resident assistance records, the move-in/move-out records, the certificate records, the contract records, and records associated with licenses to generate statistical outputs comprising at least one of graphs and listings on the graphical user interface for at least one of the multiple-unit dwellings having records within the library of the system.

* * * * *